United States Patent
Mehta et al.

(10) Patent No.: US 12,437,034 B2
(45) Date of Patent: Oct. 7, 2025

(54) MULTIPLE TARGETED INTRANET AND EMPLOYEE ENGAGEMENT EXPERIENCES WITHIN A TENANT

(71) Applicant: Microsoft Technology Licensing, LLC, Redmond, WA (US)

(72) Inventors: Tejas Pravin Mehta, Sammamish, WA (US); Nancy Handa, Seattle, WA (US); Anshuman Gaur, Dallas, TX (US); Mathew Alexander Mooty, Bothell, WA (US); Paula Wing, Redmond, WA (US); Junle Li, Redmond, WA (US); Christina Ray, San Luis Obispo, CA (US); Chase Aaron Hignight, Dallas, TX (US); Maya Angele Pelichet, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 18/326,536

(22) Filed: May 31, 2023

(65) Prior Publication Data

US 2024/0386077 A1    Nov. 21, 2024

Related U.S. Application Data

(60) Provisional application No. 63/503,047, filed on May 18, 2023.

(51) Int. Cl.
*G06F 21/10* (2013.01)
*H04L 9/40* (2022.01)

(52) U.S. Cl.
CPC ............ *G06F 21/105* (2013.01); *H04L 63/10* (2013.01); *G06F 21/1073* (2023.08)

(58) Field of Classification Search
CPC ..... G06F 21/105; G06F 21/1073; H04L 63/10
(Continued)

(56) References Cited

U.S. PATENT DOCUMENTS

| 11,886,434 | B1 * | 1/2024 | Magnuson | .......... G06F 9/44505 |
| 2012/0317621 | A1 * | 12/2012 | Mihara | .................. G06F 21/10 |
| | | | | 726/4 |

(Continued)

FOREIGN PATENT DOCUMENTS

| EP | 3767497 A1 * | 1/2021 | ........... H04L 67/025 |
| WO | WO-2013089377 A1 * | 6/2013 | ........... G06V 30/224 |

OTHER PUBLICATIONS

Zhang et al., "A Novel Software Defined Networking Framework for Cloud Environments," 2016 IEEE 3rd International Conference on Cyber Security and Cloud Computing (CSCloud), Beijing, China, 2016, pp. 30-35, doi: 10.1109/CSCloud.2016.22. (Year: 2016).*

(Continued)

*Primary Examiner* — Peter C Shaw
(74) *Attorney, Agent, or Firm* — Han Gim; Newport IP, LLC

(57) ABSTRACT

A data processing system implements providing multiple targeted intranet sites and/or employee experiences within a tenant of a multitenant computing environment. The administrators of a tenant are provided with tools to create multiple separate instances of the intranet site and/or employee experiences. The individual instances of the intranet site and/or employee experiences are separate and utilize a layout and include components that are appropriate for the particular audience for which the instance of the intranet site or employee experience has been tailored. The administrator can define affinity information that indicates which users or groups of users should be directed to a particular intranet site and/or employee experience. The administrator can define (Continued)

an order in which the intranet sites and/or employee experiences are considered when determining which intranet site or employee experience to present to a user in response to a request to access the intranet site or the employee experience.

17 Claims, 26 Drawing Sheets

(58) Field of Classification Search
USPC .............................................. 726/4
See application file for complete search history.

(56) References Cited

U.S. PATENT DOCUMENTS

| | | | | |
|---|---|---|---|---|
| 2015/0040187 A1* | 2/2015 | Fujii | ................... | H04L 63/0876 726/3 |
| 2021/0203731 A1* | 7/2021 | Garty | ...................... | H04L 67/51 |
| 2024/0211237 A1* | 6/2024 | R | .......................... | H04L 9/0894 |
| 2024/0223655 A1* | 7/2024 | Lan | ..................... | H04L 65/1073 |
| 2024/0323034 A1* | 9/2024 | Kumar | ................. | H04L 9/3268 |

OTHER PUBLICATIONS

Marimuthu et al., "Software Development for Cloud: An Experiential Study," 2013 International Conference on Cloud Computing and Big Data, Fuzhou, China, 2013, pp. 183-190, doi: 10.1109/CLOUDCOM-ASIA.2013.98. (Year: 2013).*

Song et al., "A data-driven storage recommendation service for multitenant storage management environments," 2015 IFIP/IEEE International Symposium on Integrated Network Management (IM), Ottawa, ON, Canada, 2015, pp. 1026-1040, doi: 10.1109/INM.2015.7140429. (Year: 2015).*

Nandi et al., "Dynamic SLA based elastic cloud service management: A SaaS perspective," 2013 IFIP/IEEE International Symposium on Integrated Network Management (IM 2013), Ghent, Belgium, 2013, pp. 60-67. (Year: 2013).*

* cited by examiner

Manage Experiences

Create and manage different employee experiences for the entire organization. Some audiences may be associated with to more tha[n one] employee experiences are considered when matching an experien[ce to] members toward the top of the list.

+ Create New Experience                    ⇄

| | Name | Status | Order |
|---|---|---|---|
| ☐ | Human Resources | Enabled | 1 |
| ☐ | Legal | Enabled | 2 |
| ☐ | Management and Finance | Draft | 3 |
| ☐ | Contoso Americas | Enabled | 4 |
| ☐ | Contoso Europe | Enabled | 5 |
| ☐ | Frontline Workers | Enabled | 6 |
| ☐ | Default | Enabled | 7 |

405

Management and Finance Experience

🔲 Open in Meetings App   ⌇ Analytics            🗑 Delete

| General | Audience | Permissions |
|---|---|---|

Experience Name
Management

URL
../sites/management

Time Zone
(UTC -8:00 US & Canada)

Status
Draft

License Type
Any

Default Language
English

Experience Description
The Management experience is where members of the management team can access tools, news and personalized resources.

Creation Date and Details
3/10/2023 at 11:31 AM by Jenna Wang from the Admin Center

Contoso Human Resources

Documents – Quickly access documents that you and other members of the Human Resources team have created or modified.

| | | |
|---|---|---|
| Q2-Action Plan.ppt | dcopley | 03-10-2023 10:05am |
| Strategic Growth Initiative.docx | jkim | 03-03-2023 09:35am |
| Project X | gwang | 03-11-2023 02:37pm |
| Product Release Presentation | gmehta | 03-03-2023 02:05pm |

Contoso Directory – search for employees in the Employee Director

News

| Hiring Trends for 2023 | Online Benefits Portals | Selecting a Retirement Plan Provider |

Tools

Time Entry　Jobs Portal　Training　Messaging

Contoso Americas

News & Announcements

| Benefits Enrollment Deadline | Upcoming Seminars | Updates to the Time Entry System | Thank you for an Amazing Q1 2023 | Selecting a Retirement Plan Provider |

Documents – Quickly access documents that you recently edited.

| | | |
|---|---|---|
| Europe-2023-Report.ppt | jmcfadden | 03-Mar-2023 10:05am |
| Responsible AI.ppt | mmartin | 03-Apr-2023 09:35am |
| Marketing Initiative | mguitierrez | 03-Mar-2023 02:37pm |
| Product Spotlight | agupta | 04-Apr-2023 02:05pm |

Contoso Directory – search the Employee Directory

Tools

Time Entry   Jobs Portal   Training   Messaging

Contoso Europe

Task List

Contoso Europe Directory – search the Employee Directory

Documents – Quickly access documents that you recently edited.

| | | |
|---|---|---|
| Europe-2023-Report.ppt | jmcfadden | 03-Mar-2023 10:05am |
| Responsible AI.ppt | mmartin | 03-Apr-2023 09:35am |
| Marketing Initiative | mguitierrez | 03-Mar-2023 02:37pm |
| Product Spotlight | agupta | 04-Apr-2023 02:05pm |

News & Announcements

| European Market Initiatives | Upcoming Seminars | Updates to the Time Entry System | Thank you for an Amazing Q1 2023 |

Tools

- Time Entry
- Training
- Jobs Portal
- Messaging
- Calendar

Contoso Legal

Recent Case Law News

| AA vs BB Inc. | Scope of the MedXYZ case | Drafting Employment Agreements |

Documents – Quickly access documents that you recently edited.

| Case Law Luncheon Presentation.ppt | 03-10-2023 10:05am |
| AavsBB Case Summary.docx | 03-03-2023 09:35am |
| Licensing Agreement | 03-11-2023 02:37pm |
| Discovery Schedule | 03-03-2023 02:05pm |

Contoso Directory – search for employees in the Employee Directory

Tools

Time Entry    Jobs Portal    Training    Messaging

Contoso

News & Announcements

| Benefits Enrollment Deadline | Upcoming Seminars | Updates to the Time Entry System | Thank you for an Amazing Q1 2023 | Selecting a Retirement Plan Provider |

Documents – Quickly access documents that you recently edited.

ProjectX-Presentation.ppt             03-10-2023 10:05am
Support-Documents.docx                03-03-2023 09:35am
Project X                             03-11-2023 02:37pm
Product Release Presentation          03-03-2023 02:05pm

Contoso Directory – search for employees in the Employee Directory

Tools

Time Entry   Jobs Portal   Training   Messaging

Manage Intranet Sites

Create and manage different intranet landing pages for the entire organization. Some audiences may be associated with to more tha intranet sites are considered when matching a site to a user by pla the top of the list.

➕ Create New Intranet Site

| Name | Status | Order |
|---|---|---|
| ☐ Human Resources | Enabled | 1 |
| ☐ Legal | Enabled | 2 |
| ☐ Management and Finance | Draft | 3 |
| ☐ Contoso Americas | Enabled | 4 |
| ☐ Contoso Europe | Enabled | 5 |
| ☐ Frontline Workers | Enabled | 6 |
| ☐ Default | Enabled | 7 |

505

Management Intranet Landing Page

🖥 Open in Meetings App   📈 Analytics      🗑 Delete

| General | Audience | Permissions |
|---|---|---|

Experience Name
Management

URL
../sites/management

Time Zone
(UTC -8:00 US & Canada)

Status
Draft

License Type
Any

Default Language
English

Experience Description
The Management Intranet page is where members of the management team can access tools, news and personalized resources.

Creation Date and Details
3/10/2023 at 11:31 AM by Jenna Wang from the Admin Center

| Name | Status | Order | Audience | License Type | Home Site | URL |
|---|---|---|---|---|---|---|
| Contoso Americas | Enabled | 1 | S-A | All | No | ../sites/americas |
| Contoso Europe | Enabled | 2 | S-B | All | No | ../sites/europe |
| Human Resources | Enabled | 3 | HR1 | All | No | ../sites/HR |
| Legal | Enabled | 4 | L1 | All | No | ../sites/legal |
| Management | Draft | 5 | MG1 | All | No | ../sites/management |
| Default | Enabled | 6 | Everyone | Frontline Worker | Yes | ../sites/default |

| Name | Status | Order | Audience | License Type | Default Experience | URL |
|---|---|---|---|---|---|---|
| Contoso Americas | Enabled | 1 | S-A | All | No | ../exp/americas |
| Contoso Europe | Enabled | 2 | S-B | All | No | ../exp/europe |
| Human Resources | Enabled | 3 | HR1 | All | No | ../exp/HR |
| Legal | Enabled | 4 | L1 | All | No | ../exp/legal |
| Management | Draft | 5 | MG1 | All | No | ../exp/management |
| Default | Enabled | 6 | Everyone | Frontline Worker | Yes | ../exp/default |

MULTIPLE TARGETED INTRANET AND EMPLOYEE ENGAGEMENT EXPERIENCES WITHIN A TENANT

BACKGROUND

Current corporate intranets have a single point of entry through which all of its employees access the same home site. Similarly, employee experience platforms, which enable a corporation to provide an employee experience that provides tools and content to employees to improve productivity, growth and learning, and alignment on business goals, provide a single, customer level container for the experience. The content of the container is then targeted for different employee groups. However, this approach introduces significant complexity and scalability challenges to the design of the employee experience as well as introducing compliance risks.

Many intranet sites and employee engagement experiences are set up in a multitenant computing environment. The multitenant computing environment is divided into multiple logical "tenants" that each have its own set of user accounts, resources, licenses, and policies associated with them. A tenant may be a company, a university, a government agency, or some other such entity that utilizes the services of the multitenant computing environment. Each tenant may have an intranet site and/or employee engagement experience that can be accessed by users associated with the tenant.

However, many corporations have a diverse workforce with very different needs that would benefit from an intranet site or employee experience that is tailored to the specific needs of its employees. One solution to this problem is to create a separate tenant for each of the various groups of employees and provide a customized intranet and/or customer experience for each tenant. However, this solution is impractical, because it introduces significant licensing and access permission issues to permit users to collaborate in such multitenant environment. These issues would not arise in a single tenant architecture. Implementing such multiple intranet or customer experiences would also require an onerously complex information architecture and discrete access permissions. Implementing and maintaining such an architecture would not only be labor intensive from an administrator standpoint but would also be an error prone manual process that could negatively impact the user experience. Hence, there is a need for improved systems and methods of providing a multiple targeted intranet and employee engagement experiences within a tenant.

SUMMARY

An example data processing system according to the disclosure may include a processor and a machine-readable medium storing executable instructions. The instructions when executed cause the processor to perform operations including receiving, from a first client device of a first user over a first network connection, a request to access an intranet site associated with a tenant of a multitenant computing environment, the request including first user information that identifies the first user; obtaining first tenant license information for the first user from a license datastore stored in a memory of the multitenant computing environment associated with the tenant; accessing affinity information from an intranet site information datastore stored in a memory of the multitenant computing environment associated with the tenant; comparing the first user information and the first tenant license information with the affinity information to select a first intranet site from among a plurality of intranet sites implemented on the tenant of the multitenant computing environment; sending, over the first network connection, a first Universal Resource Locator (URL) of the first intranet site to the first client device of the first user; and sending a first signal, over the first network connection, causing the first client device of the first user to present the first intranet site on a display of the first client device.

An example method implemented in a data processing system for providing multiple targeted intranet site within a tenant of a multitenant computing environment includes receiving, from a first client device of a first user over a first network connection, a request to access an intranet site associated with a tenant of a multitenant computing environment, the request including first user information that identifies the first user; obtaining first tenant license information for the first user from a license datastore stored in a memory of the multitenant computing environment associated with the tenant; accessing affinity information from an intranet site information datastore stored in a memory of the multitenant computing environment associated with the tenant; comparing the first user information and the first tenant license information with the affinity information to select a first intranet site from among a plurality of intranet sites implemented on the tenant of the multitenant computing environment; sending, over the first network connection, a first Universal Resource Locator (URL) of the first intranet site to the first client device of the first user; and sending a first signal, over the first network connection, causing the first client device of the first user to present the first intranet site on a display of the first client device.

An example data processing system according to the disclosure may include a processor and a machine-readable medium storing executable instructions. The instructions when executed cause the processor to perform operations including receiving, from a first client device of a first user over a first network connection, a request to access an employee experience associated with a tenant of a multitenant computing environment, the request including first user information that identifies the first user, the employee experience providing tools and content to employees to improve productivity, growth and learning, and alignment on business goals; obtaining first tenant license information for the first user from a license datastore stored in a memory of the multitenant computing environment associated with the tenant; accessing affinity information from an employee experience site information datastore stored in a memory of the multitenant computing environment associated with the tenant; comparing the first user information and the first tenant license information with the affinity information to select a first employee experience from among a plurality of employee experiences implemented on the tenant of the multitenant computing environment; sending, over the first network connection, a first Universal Resource Locator (URL) of the first employee experience to the first client device of the first user; and sending a first signal, over the first network connection, causing the first client device of the first user to present the employee experience on a display of the first client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4C are diagrams of example user interfaces for creating targeted employee experiences for a tenant of a multitenant computing environment;

FIGS. 4D-4K are diagrams showing example targeted employee experience user interfaces.

FIGS. 5A-5C are diagrams of example user interfaces for creating targeted intranet sites for a tenant of a multitenant computing environment;

FIG. 6A shows an example of an intranet configuration data structure.

FIG. 6B shows an example of an employee experience configuration data structure.

DETAILED DESCRIPTION

Figure 1A:
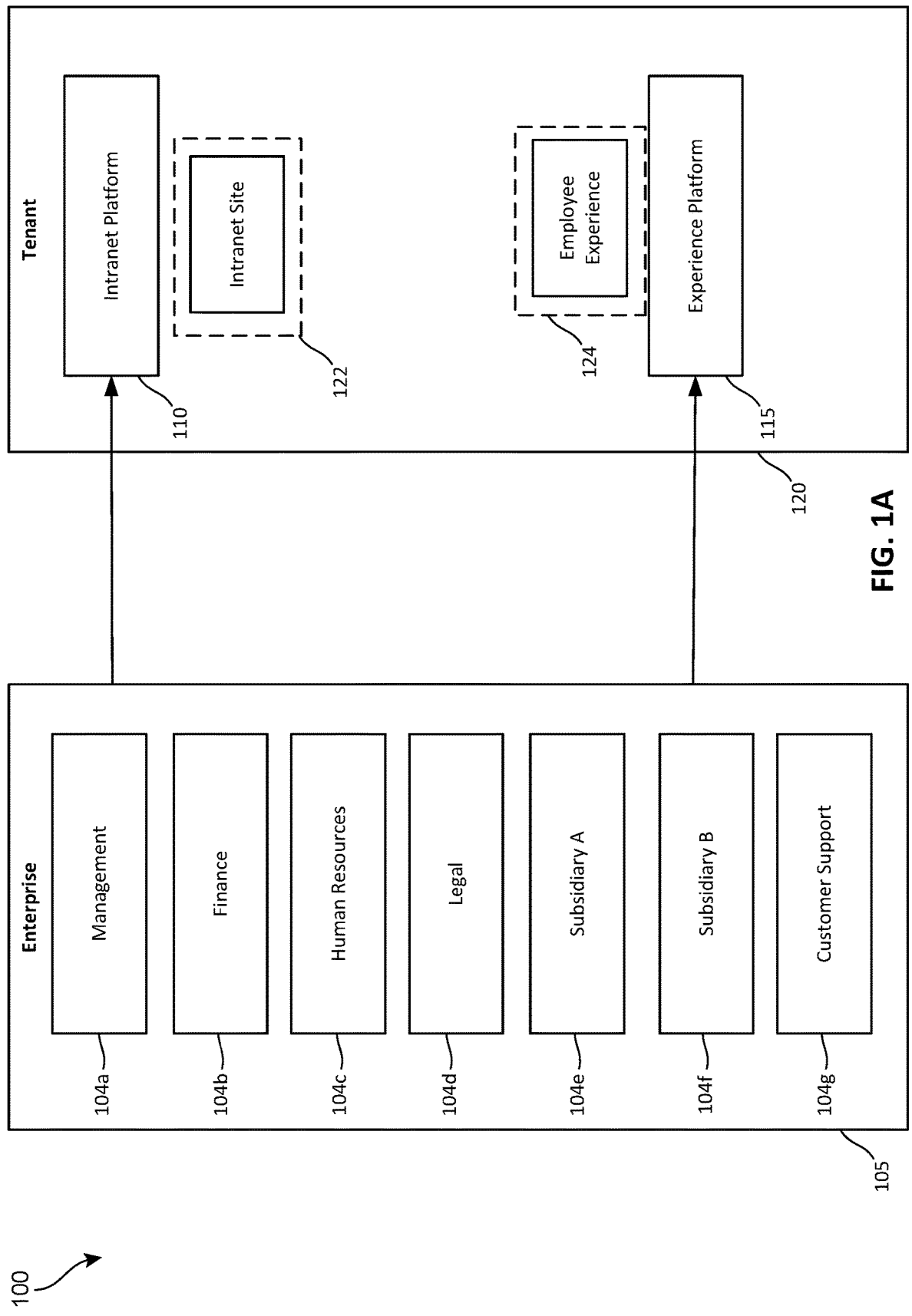
FIGS. 1A and 1B are diagrams showing an example computing environment which shows an enterprise and the tenant of the enterprise on a multitenant computing environment.

Techniques for providing multiple targeted intranet sites and/or employee experiences within a tenant are provided. These techniques solve the technical problems associated with providing multiple intranet sites and/or employee experiences in a tenant in a multitenant computing environment. Each tenant is typically an enterprise or other organization, and each tenant is associated with its own set of user accounts, resources, licenses, and access policies. Current multitenant computing environments provide means for administrators of the enterprise to set up an intranet site, which offers authorized users with a single point of entry through which the authorized users may access enterprise intranet. Some current multitenant computing environments also provide means for administrators of the enterprise to set up an employee experience that provides tools and content to employees to improve productivity, growth and learning, alignment on business goals, and provide a single experience to all employees. The employee experience may be implemented to be accessible from a web-enabled native application on a client device of the employees or via web application.

Corporations often have a diverse workforce that have very different needs with regard to the information and tools that are provided by the intranet site and/or the employee experience. Consequently, designing an intranet site or employee experience that meets the needs of this diverse workforce can be a challenge. Ideally, the administrator of the enterprise could create multiple intranet sites and/or employee experiences customized to meet the needs of various groups of employees within the enterprise. However, creating multiple intranet sites and/or employee experiences within a tenant is currently not possible. Furthermore, creating multiple tenants for an enterprise is not a viable solution to this problem, because this approach would introduce significant challenges associated with licensing and access permissions to permit the employees of the enterprise to collaborate across tenants. Other current solutions to providing customized intranet and/or employee experiences rely on a singular instance of the intranet site or employee experience but attempt to customize the experience by configuring individual components of the intranet site or employee experience. However, this latter approach is cumbersome and often results in a less than desirable user experience.

The techniques provided herein provide a technical solution to these problems by providing for multiple intranet sites and/or employee experiences within a tenant. These techniques can be implemented in but are not limited to Microsoft SharePoint® and Microsoft Viva®. These techniques provide the administrators of a tenant with the ability to create multiple separate instances of the intranet site and/or employee experiences. The individual instances of the intranet site and/or employee experiences are completely separate and utilize a layout and include components that are appropriate for the particular audience for which the instance of the intranet site or employee experience has been tailored. This solution has been designed to be backward compatible with the existing architecture of the tenant to ensure other features of the tenant, such as but not limited to the existing search, navigation, and audience targeting functionality, are not impacted. The techniques herein provide administrators with a cohesive user interface that enables administrators to create and deploy multiple intranet sites and/or employee experiences. The administrator can define affinity information that indicates which users or groups of users should be directed to a particular intranet site and/or employee experience. Furthermore, the administrator may define an order in which the intranet sites and/or employee experiences are considered when determining which intranet site or employee experience to present to a user in response to a request to access the intranet site or the employee experience. A technical benefit of this approach is that the administrator is provided with a set of tools that provide a flexible and easily extensible framework for implementing multiple intranet sites and/or employee experiences. These and other technical benefits of the techniques disclosed herein will be evident from the discussion of the example implementations that follow.

FIG. 1A is a diagram showing an example computing environment 100 which shows an enterprise 105 and the tenant 120 of the enterprise 105 on a multitenant computing environment. The multitenant computing environment is a cloud-based computing environment that provides computing and storage resources for the tenants of the multitenant computing environment. Each tenant has its own set of user accounts, resources, licenses, and policies that implement how the users of the tenant are able to access and utilize the tenant resources on the multitenant computing environment. In some implementations, the multitenant computing environment is implemented by Microsoft Sharepoint®. Other implementations may be implemented by other multitenant computing environment platforms.

An enterprise may include a number of users, and these users may be grouped into logical groupings based at least in part on the role of the users within the organization. FIG. 1A provides a non-limiting example that demonstrates this concept. The enterprise 105 includes a management group 104a, a finance group 104b, a human resources group 104c, a legal group 104d, and a customer support group 104g. Each of these groups of users have different needs with respect to the tools and information provided by an intranet site and/or employee experience and would benefit from an intranet site and/or employee experience that is tailored to that group of users. However, the intranet platform 110 provided by current multitenant computing environment only support a single intranet site 122, and the experience platform 115 provided by multitenant computing environment only support a single employee experience 124.

An enterprise may include one or more subsidiaries, divisions, branches, or other logical groupings of users. In the non-limiting example shown in FIG. 1A, the enterprise 105 includes a subsidiary A 104e and a subsidiary B 104f, which are responsible for two separate brands, Brand A and Brand B, owned by the enterprise 105. Each of the subsidiaries 104e and 104f are associated with a set of users that perform work specific to that brand for the enterprise 105. Consequently, the users associated with subsidiary A 104e perform various tasks related to Brand A, while the users associated with the subsidiary B 104f perform various tasks related to Brand B. The users associated with a respective one of these brands do not perform tasks related to the other brand. Therefore, the users associated with subsidiary A 104e would benefit from an intranet site and/or employee experience that is tailored to Brand A, while the users associated with subsidiary B 104f would benefit from an intranet site and/or employee experience that is tailored to Brand B. However, as discussed above, the intranet platform 110 provided by current multitenant computing environments only support a single intranet site 122, and the experience platform 115 provided by multitenant computing environment only support a single employee experience 124.

Figure 1B:
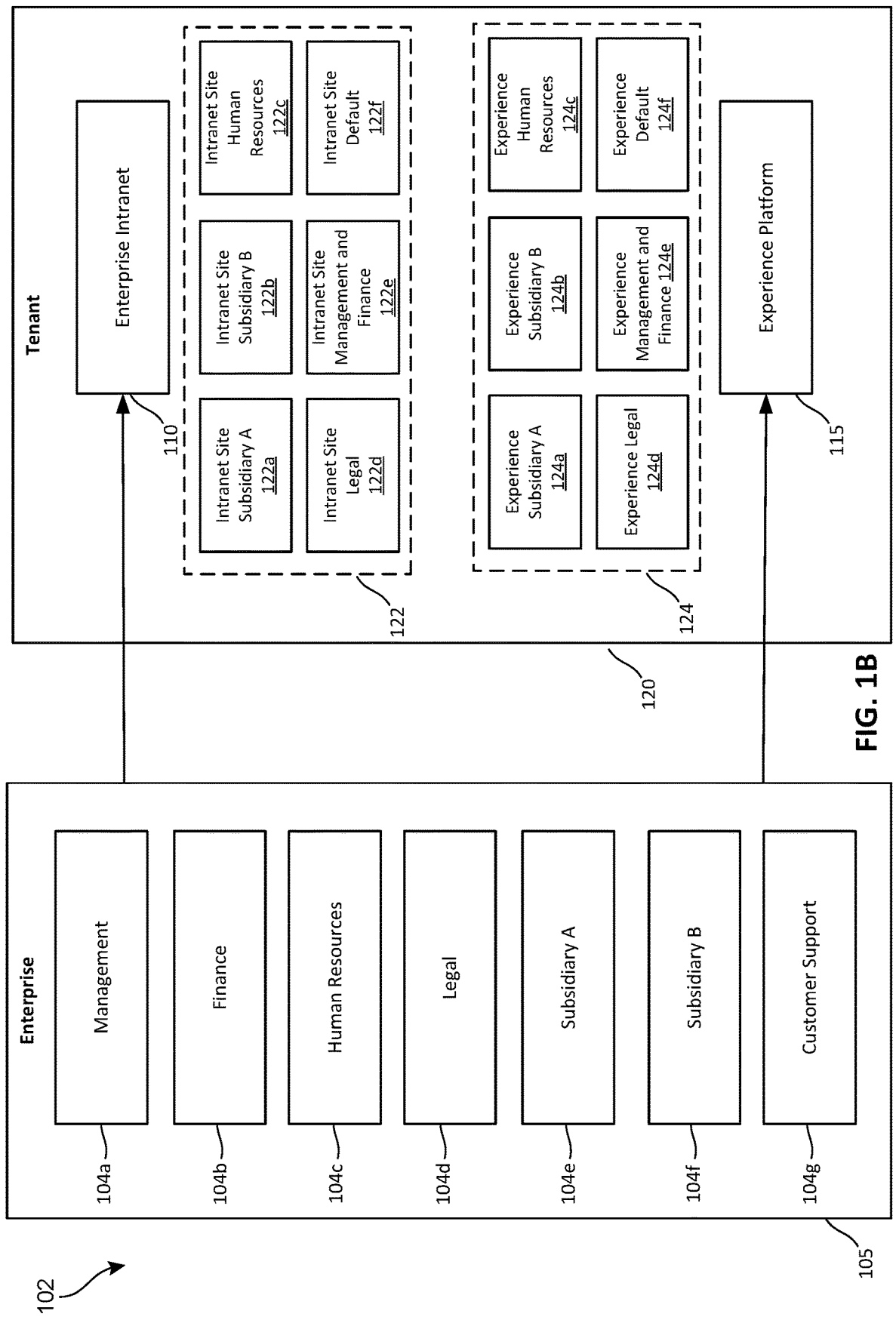

As shown in FIG. 1A, an enterprise, such as the enterprise 105, may include various groups of users that could benefit from having intranet sites and/or employee experiences that are tailored to the needs of those users. FIG. 1B shows another example of the enterprise 105 and the tenant 120 in which the tenant 120 supports multiple intranet sites 122a, 122b, 122c, 122d, 122e, and 122f (collectively referred to as intranet site 122) and/or employee experiences 124a, 124b, 124c, 124d, 124e, and 124f (collectively referred to as employee experience 124). In the example shown in FIG. 1B, separate intranet sites have been implemented for the human resources group 104c, the legal group 104d, the subsidiary A 104e, and the subsidiary B 104f. In this implementation, the finance group 104b and the management group 104a are provided with an intranet site 122 and employee experience 124 that provides tools and information that the users in both groups can utilize. In other implementations, the administrator of the tenant 120 may set up a separate intranet site and/or user experience for these groups.

The example implementation shown in FIG. 1B also includes a default intranet site 122f and a default employee experience 124f. The default intranet site 122f and a default employee experience 124f are provided for users who do not fall into one of the categories above. The examples which follow describe how an administrator can set up multiple intranet sites 122 and/or employee experiences 124 and define the criteria that the enterprise internet platform 110 and the experience platform 115 of the tenant use to select the appropriate intranet site 122 and/or employee experience 124 to present to a particular user.

Figure 2:
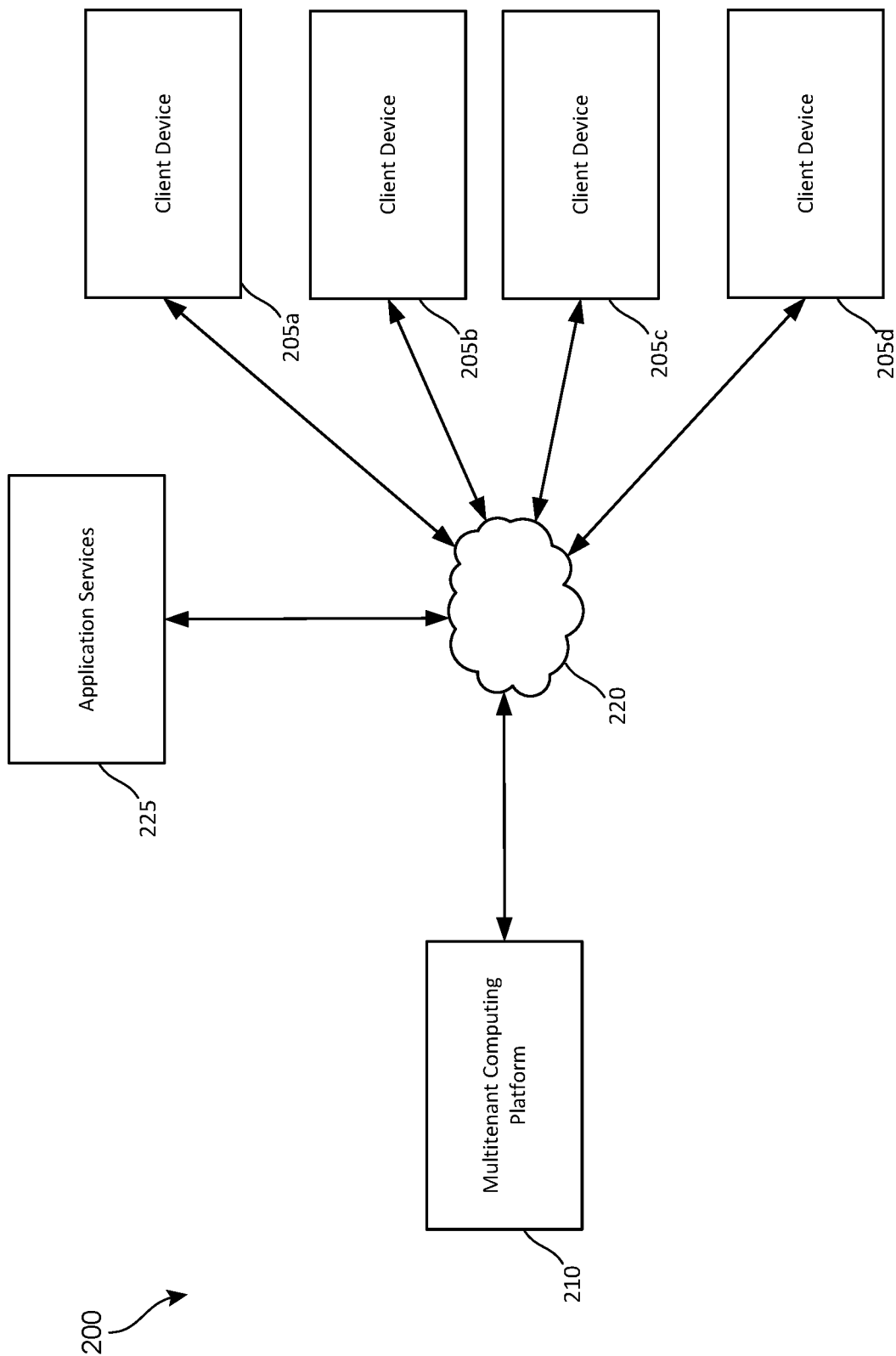
FIG. 2 is a diagram showing an example computing environment in which the techniques disclosed herein for providing targeted intranet sites and/or employee experiences in a tenant of a multitenant computing environment may be implemented.

FIG. 2 is a diagram showing an example computing environment 200 in which the techniques disclosed herein for providing targeted intranet sites and/or employee experiences in a tenant of a multitenant computing environment may be implemented. The computing environment 200 includes a multitenant computing platform 210. The example computing environment 200 also includes client devices 205a, 205b, 205c, and 205d (collectively referred to as client device 205), and an application services platform 225. The client devices 205a, 205b, 205c, and 205d communicate with the multitenant computing platform 210 and/or the application services platform 225 via the network 220. Furthermore, the multitenant computing platform 210 communicates with the application services platform 225 via the network 220. The network 220 may be a combination of one or more public and/or private networks and may be implemented at least in part by the Internet.

In the example shown in FIG. 2, the multitenant computing platform 210 is implemented as a cloud-based service or set of services. The multitenant computing platform 210 provides computing and storage resources for multiple tenants. As discussed in the preceding examples, each tenant may be enterprise or other organization, and each tenant is associated with its own set of user accounts, resources, licenses, and access policies. The multitenant computing platform 210 implements the techniques provided herein for providing multiple targeted intranet sites and/or employee engagement experiences within a tenant, such as the tenant 120 shown in FIG. 1B. In some implementations, the multitenant computing platform 210 is implementing using Microsoft SharePoint®. Other implementations can utilize other multitenant computing platforms to implement the multitenant computing platform 210.

The application services platform 225 provides users with applications that may be accessed from a web browser or web-enabled native application of the client device of the users, such as the client devices 205a, 205b, 205c, and 205d. The application services platform 225 implements various types of applications, including but not limited to communication and collaboration platforms that enable users to communicate with one another and/or collaborate on the creation of various types of electronic content. In some implementations, the application services platform 225 is implemented by Microsoft Teams® or another such communication and collaboration platform. The application services platform 225 utilizes one or more services provided by the multitenant computing platform 210 in some implementations. For example, the application services platform 225 provides an application that integrates the employee experience provided by the multitenant computing platform 210 in some implementations. This approach enables the enterprise to provide tools and content to employees to improve productivity, growth and learning, and alignment on business goals as an integrated experience with other tools that the users utilize, such as communications or collaboration platform, to provide the users with a seamless experience. The tools and information that the users are likely to need are presented to the user within the framework of a single application. Users do not need to seek out these tools or information in multiple applications. However, in some implementations, the multitenant computing platform 210 provides access to the employee experience via a web browser or web-enabled native application on the client device 205 of the users. This approach can be used to provide users with multiple options for accessing the employ experience. In some implementations, the standalone employee experience may be offered instead of the integration with the application services platform 225.

The client devices 205*a*, 205*b*, 205*c*, and 205*d* can be used by a user to access the services provided by the multitenant computing platform 210 and/or the application services platform 225. The users can access the intranet site and/or employee experiences provided by the multitenant computing platform 210. The users may also access the employee experiences provided by the multitenant computing platform 210 indirectly through an application or applications provided by the application services platform 225. The client devices 205*a*, 205*b*, 205*c*, and 205*d* may be used by administrators to access the multitenant computing platform 210 and to create and/or modify intranet sites and/or employee experiences.

The client devices 205*a*, 205*b*, 205*c*, and 205*d* are each a computing device that may be implemented as a portable electronic device, such as a mobile phone, a tablet computer, a laptop computer, a portable digital assistant device, a portable game console, and/or other such devices. The client devices 205*a*, 205*b*, 205*c*, and 205*d* may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices 205 that may utilize the services provided by the multitenant computing platform 210 and/or the application services platform 225. Furthermore, in some implementations, at least a portion of the application functionality provided by the multitenant computing platform 210 and/or the application services platform 225 is implemented by a native application installed on the client devices 205*a*, 205*b*, 205*c*, and 205*d*.

Figure 3:
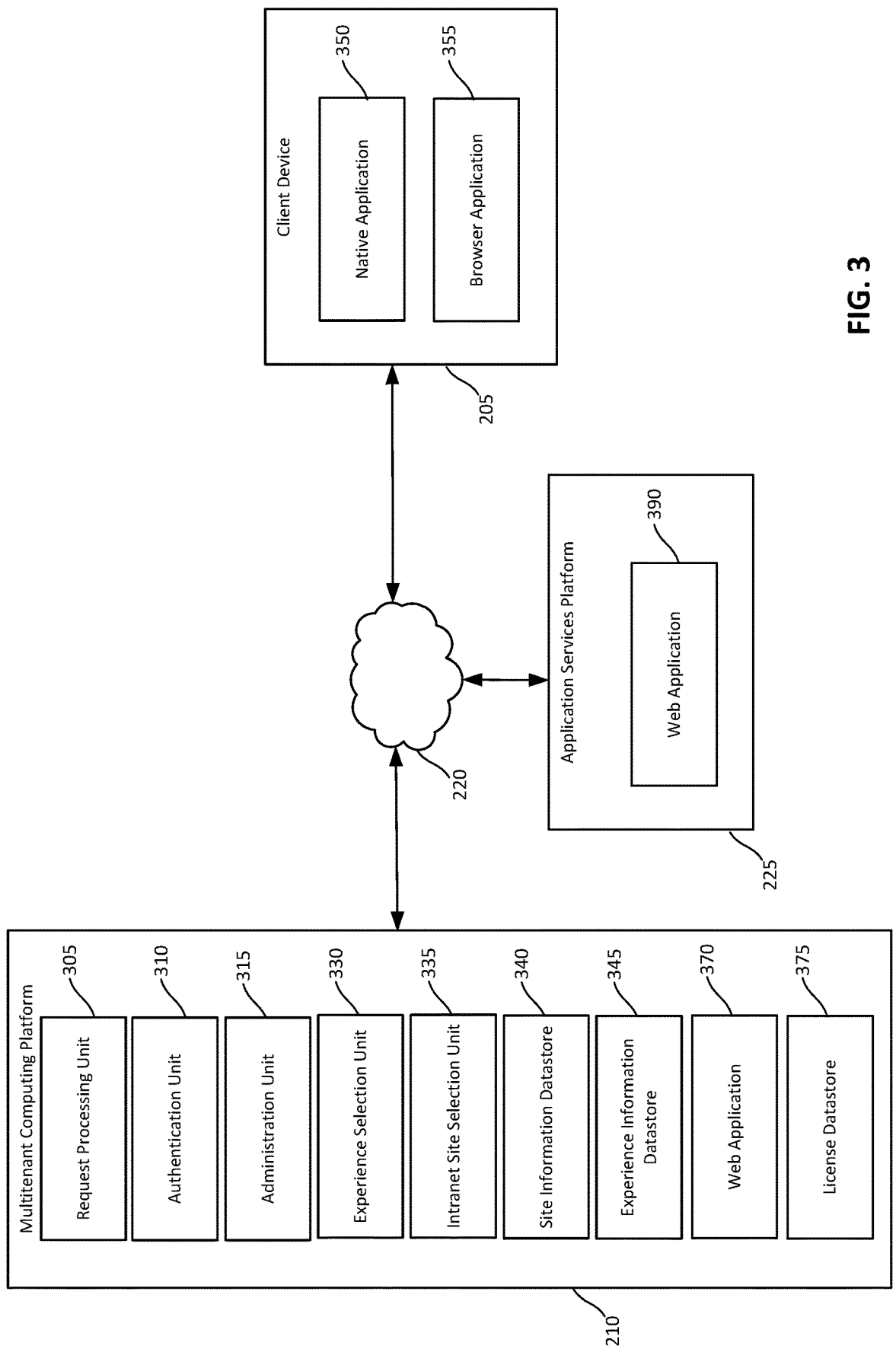
FIG. 3 is a diagram showing additional features of the multitenant computing platform 210, the client device 205, and the application services platform 225.

FIG. 3 is a diagram showing additional features of the multitenant computing platform 210, the client device 205, and the application services platform 225. The multitenant computing platform 210 includes a request processing unit 305, an authentication unit 310, an administration unit 315, an experience selection unit 330, an intranet site selection unit 335, a site information datastore 340, an experience information datastore 345, a web application 370, and a license datastore 375. The application services platform 225 includes a web application 390. The client device 205 includes a native application 350 and a browser application 355.

The request processing unit 305 processes requests from the native application 350 or the browser application 355 of the client device 205. The request processing unit can also process requests from the web application 390 of the application services platform 225. The requests received from the client device 205 can include but are not limited to request to access a targeted intranet site and requests to access an employee experience. The requests received from the application services platform 225 can include but are not limited to requests to access a targeted intranet site and requests to access an employee experience. The requests can include information identifying information identify a particular user of the multitenant computing platform 210, information identifying the tenant with which the user is associated, authentication information that indicates whether the user is authorized to access the services requested from the multitenant computing platform 210. The request processing unit 305 is also configured to obtain tenant license information for the user from the license datastore 375 in some implementations. The tenant license information indicates a type of license associated with the user. The license type information is one of the criteria that may be used to determine which employee experience from among a plurality of employee experiences and/or which intranet site from among a plurality of intranet sites to which the user should be directed.

The authentication unit 310 provides functionality for verifying whether users are permitted to access the services provided by the multitenant computing platform 210. In some implementations, the authentication unit 310 provides functionality for receiving authentication credentials for the users from their respective client device 205. The authentication unit 310 may be configured to verify that the authentication credentials are valid and permit the users to access the services provided by the multitenant computing platform 210 responsive to the authentication credentials being valid. In some implementations, the requests from the client device 205 or the application services platform 225 include an access token, and the authentication unit 310 uses this access token to determine whether the request associated with the access token may be granted.

Figure 4A:
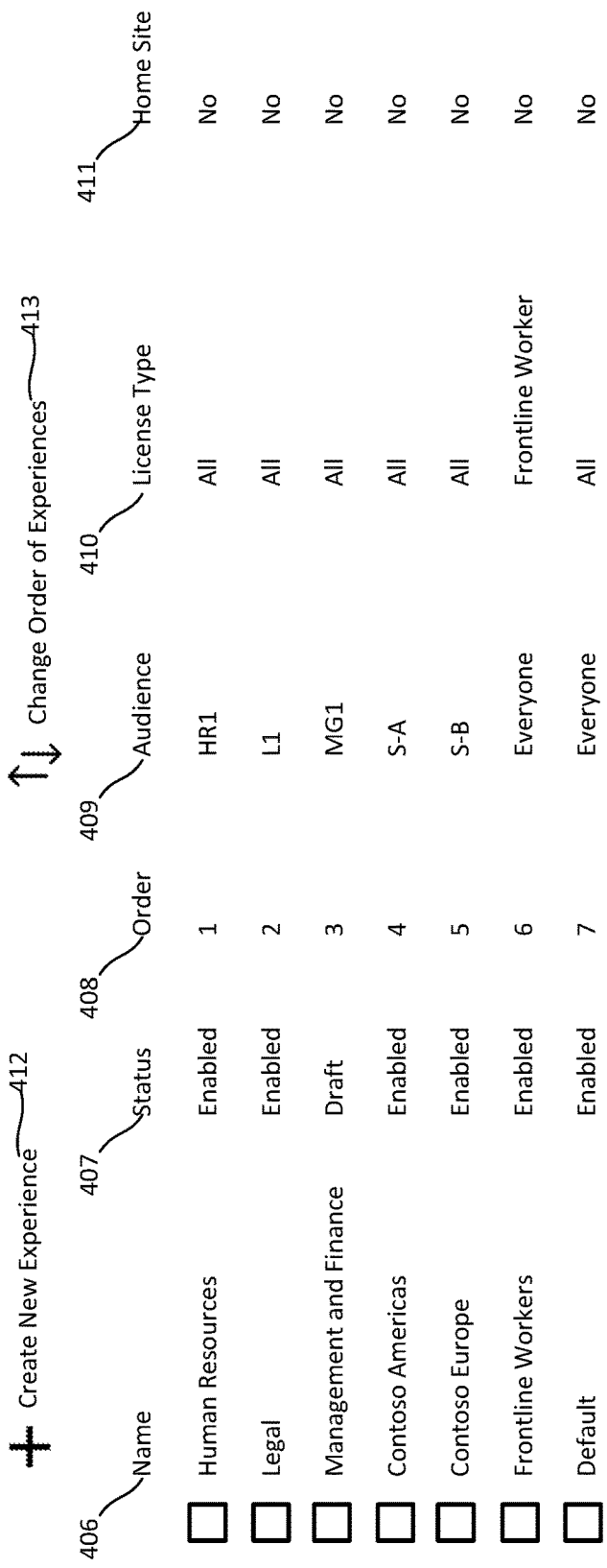
Figure 5A:
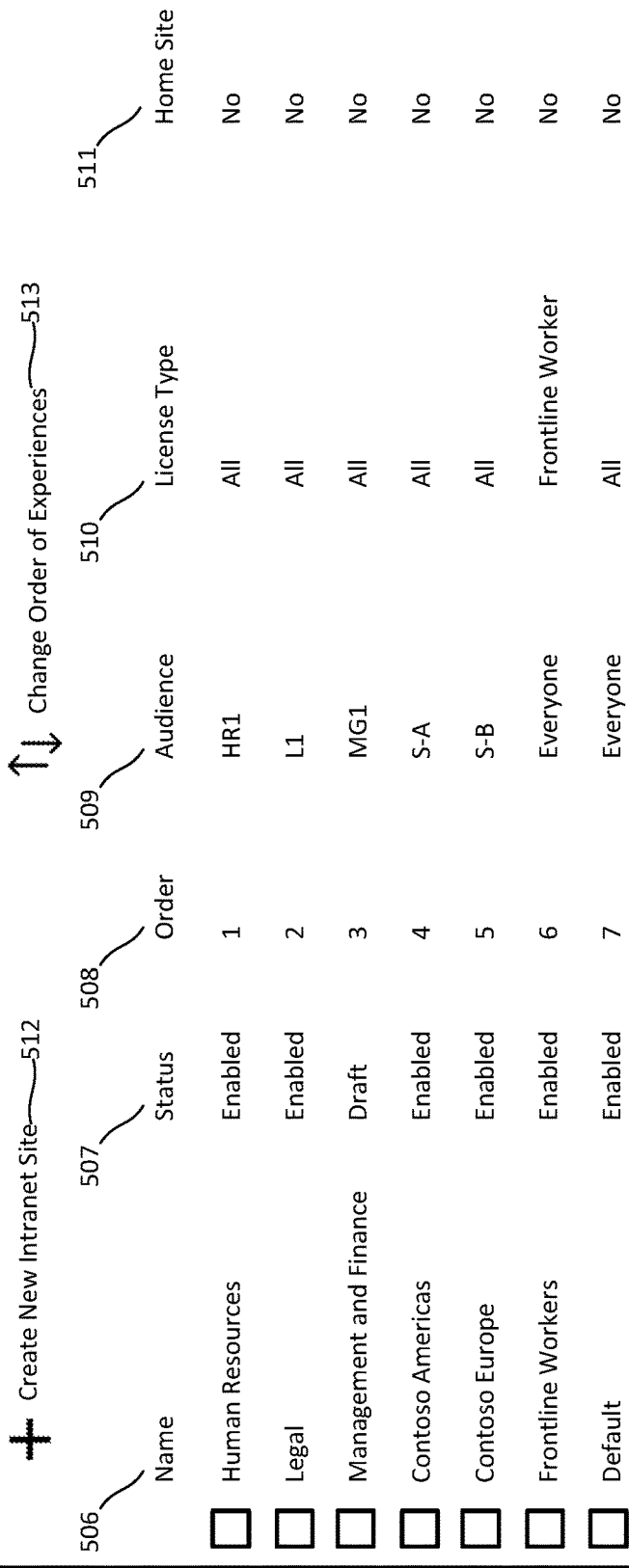

The administration unit 315 provides a user interface for managing the intranet sites and employee experiences for a tenant of the multitenant computing platform 210 and for defining the affinity information that indicates which intranet site or employee experience should be presented to a particular user. FIGS. 4A and 4B show an example user interface 405 implemented by the administration unit 315 for managing the employee engagement experiences that are available in a tenant of the multitenant computing platform 210. FIGS. 5A and 5B show an example user interface 405 implemented by the administration unit 315 for managing the intranet sites that are available in a tenant of the multitenant computing platform 210.

The administration unit 315 enables the administrator of a tenant to define affinity information that indicates which users or groups of users should be directed to a particular intranet site and/or employee experience. The affinity information may include one or more of audience targeting information, license-based targeting information, and selective ordering of the employee experiences and/or intranet sites. Audience targeting information specifies a set of users or groups of users who should be directed to a particular intranet site and/or employee experience. The affinity information may also include license-based targeting information that specifies that users associated with a particular type of tenant license should be directed to a particular intranet site and/or employee experience. The selective ordering of the employee experiences and/or internet sites allows the administrator to define an order in which the intranet sites and/or employment experiences are considered when determining which intranet site or employment experience to present to a particular user. A technical benefit of this approach is that it provides a flexible and easily extensible framework for implementing multiple intranet sites and/or employee experiences. Additional details of how the affinity information may be defined is discussed with respect to FIGS. 4A, 4B, 5A, and 5B in the examples which follow.

Figure 4C:
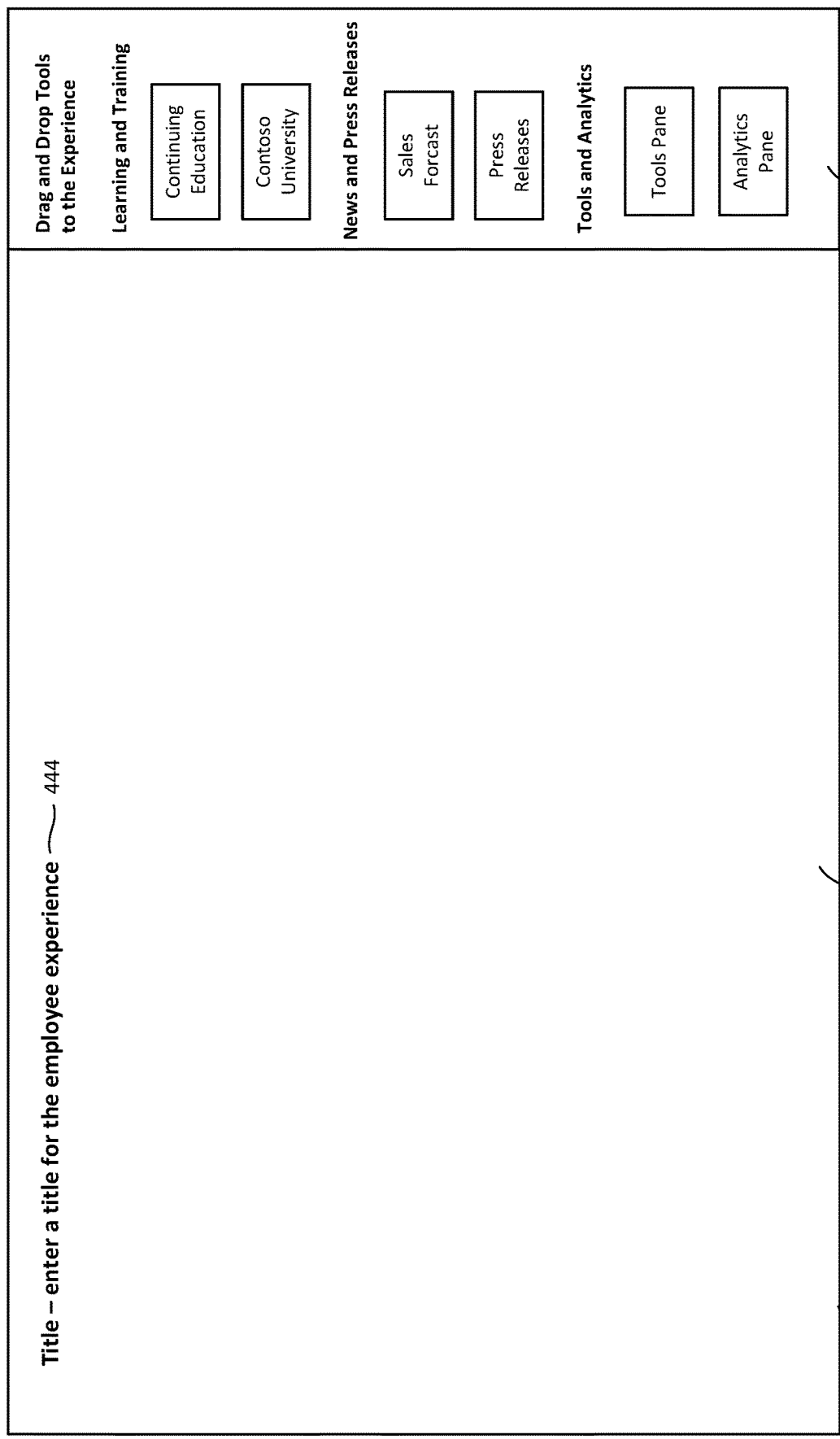

The administration unit 315 also provides tools that enable the administrator to create a new intranet site and/or employee experience. FIG. 4C, which is described in detail in the examples which follow, shows a user interface 440 provided by the administration unit 315 for creating a new intranet site and/or employee experience.

The experience selection unit 330 receives the requests to access an employee experience from the request processing unit 305 and selects the employee experience to present to the user based on the affinity criteria defined by the administrator. The intranet site selection unit 335 receives requests to access the intranet site from the request processing unit 305 and selects an instance of the intranet to be presented to the user based on the affinity criteria defined by the administrator.

The intranet site information datastore 340 is a persistent datastore that is stored in a memory of the multitenant computing platform 210. The intranet site information datastore 340 stores layout information and content information for the intranet sites that are configured by the administrator using the administration unit 315. The intranet site information datastore 340 also stores the user affinity information defined by the administrator of the tenant to determine which intranet site should be presented to a particular user. FIG. 6A shows an example of an intranet configuration data structure 605 used by the intranet site information datastore 340 to store the experience configuration information provided by the administrator via the user interface of the administration unit 315. The intranet configuration data structure 605 includes the name of the intranet site, the status, the order associated with the intranet site, the audience information for the users or user groups associated with the intranet site, the license types associated with the intranet site, the Uniform Resource Location (URL) for accessing the intranet site, and an indication whether the intranet site is a home site or default intranet site. The default may be selected for users that match none of the other intranet sites.

The experience information datastore 345 is a persistent datastore that is stored in a memory of the multitenant computing platform 210. The experience information datastore 345 stores layout information and content information for the employee experiences that are configured by the administrator using the administration unit 315. The intranet set information datastore also stores the user affinity information defined by the administrator of the tenant to determine which user experience should be presented to a particular user. FIG. 6B shows an example of an experience configuration data structure 650 that is used to store the experience configuration information provided by the administrator via the user interface of the administration unit 315. The experience configuration data structure 650 includes the name of the employee experience, the status of the employee experience, the order associated with the employee experience, the audience information for the users or user groups associated with the employee experience, the license types associated with the employee experience, the Uniform Resource Location (URL) for accessing the employee experience, and an indication whether the employee experience is default employee experience. The default may be selected for users that match none of the other employee experiences.

The web application 370 can be accessed by the browser application 355 or browser-enabled instance of the native application 350 of the client devices 205a-105d. The web application 370 provides a user interface for accessing content and/or services provided by the multitenant computing platform 210. The web application 370 provides a user interface similar to that shown in FIGS. 4A-4H in some implementations.

The license datastore 375 is a persistent datastore that includes license information for the users of the tenant. Each user is associated with a license that permits the user to access certain content on the tenant and/or to access certain features on the tenant. The tenant may support multiple types of tenant licenses that permit that provide varying levels of access to the content and/or features of the tenant. The affinity information defined by the administrator for determining which targeted intranet site and/or employee experience to present a user can associate certain license types with each of the intranet sites and/or employee experiences. The experience selection unit 330 selects an employee experience to present to the user based on the license type in some implementations. The intranet site selection unit 335 selects an intranet site to present to the user based on the license type in some implementations.

The application services platform 225 includes a web application 390. In some implementations, the application services platform 225 provides a web application 390 that that may be integrated with the multitenant computing platform 210 to provide the targeted employee experiences and/or intranet content within the web application 390. The web application 390 may provide a communications platform and/or collaboration platform that enables user to establish communication sessions with one another and/or collaborate with other users to create and share content. The web application 390 integrates the targeted employee experiences and/or intranet content to provide tools and content to employees to improve productivity, growth and learning, and alignment on business goals as an integrated experience with other tools that the users typically utilize in the communications and/or collaboration platform. This approach provides a seamless user experience in which the tools and information that users are likely to need are presented to the user within the framework of a single application. Users do not need to seek out these tools or information in multiple applications.

The client device 205 includes a native application 350 and/or a browser application 355, in some implementations. The native application 350 is configured to communicate with the multitenant computing platform 210 and/or the application services platform 225. The native application 350 can send requests to the multitenant computing platform 210 to access the targeted intranet and/or employee experiences provided by the multitenant computing platform 210 and/or other content or services provided by the multitenant computing platform 210. The native application 350 is configured to communicate with the application services platform 225 to obtain services similar to those provided by the web application 390, which in turn, obtains targeted employee experience or intranet content. The native application 350 can implement some or all of the user interfaces shown in FIGS. 4A-4K and 5A-5C in some implementations.

The browser application 355 is an application for accessing and viewing web-based content, which may be provided by web application 370 of the multitenant computing platform 210. The web application 370 can implement some or all of the user interfaces shown in FIGS. 4A-4K and 5A-5C in some implementations. The web application 370 enables the user to utilize the services of the multitenant computing platform 210 in a similar manner as the native application described above. In some implementations, the multitenant computing platform 210 supports both the native application 350 and the web application 370, and the users may choose which approach best suits their needs.

FIGS. 4A and 4B show details of a user interface 405 for managing targeted employee experiences for a tenant in a multitenant computing environment. The user interface 405 includes a control 412 for creating a new employee experience and a control 413 for changing the order of the employee experiences that have already been created. The order of the employee experiences is the order in which the experience selection unit 330 considers each of the employee experiences when determining the employee experience to which to direct the user. The user interface 405 includes a list of the employee experiences that have been created. The list includes a name 406 of the employee experience, a status indicator 407 of the employee experience, an order indicator 408, an audience indicator 409, a license type indictor 410, and a home site indicator 411. The name 406 is a name assigned to the employee experience by the administrator. The status indicator 407 indicates whether the employee experience is in a draft state or is enabled. When the administrator creates a new employee experience, the employee experience is initially in the draft state. Once the administrator is satisfied with the configuration of the employee experience, the administrator can switch the state of the employee experience from the draft state to the enabled state. The experience selection unit 330 only considers the employee experiences that are in the enabled state when determining which targeted employee experience to present to a user. The administrator may also change the state of an employee experience from the enabled state back to the draft state to permit the administrator to adjust the configuration of the employee experience and/or to temporarily disable the employee experience. The audience indicator 409 identifies one or more users or groups of users who are associated with the employee experience. For example, the legal group 104d is associated with a legal user experience shown as the fourth entry in the lists of employee experiences shown in FIG. 4A. The administrator may add each of the individual users from the legal group 104d to the audience indicator and/or may select add one or more user groups that include the users from the legal group. The license type indicator 410 indicates that type of tenant license that is associated with the employee experience. Some employee experiences may be associated with all types of licenses, while other employee experiences may be associated with a specific type or types of tenant license. For example, the default employee experience shown in the example in FIG. 4A is associated with a frontline worker tenant license. Different implementations of the multitenant computing platform 210 may support different types of tenant licenses. The home site indicator 411 indicates whether the employee experience has also been implemented as a targeted internet site by the enterprise internet 110 of the tenant 120. The administrator of the tenant 120 can instruct the multitenant computing platform 210 to implement the employee experience as one of the instances of the intranet site provided by the tenant 120. The affinity information as well as the layout and content of the employee experience is retained when creating the intranet site in some implementations.

FIG. 4B shows an example of the user interface 405 in which an experience editor pane 414 is displayed. The experience editor pane 414 enables an administrator of the tenant to edit the attributes of an employee experience. The experience editor pane 414 can be accessed by clicking on or otherwise activating one of the employee experiences show in the list of employee experiences on the user interface 405. The multitenant computing platform 210 stores the updated information in the experience information datastore 345 using the experience configuration data structure 650 shown in FIG. 6B in some implementations. The experience configuration data structure 650 includes the name of the employee experience, the status of the employee experience, the order in which the employee experiences are to be considered when determining which employee experience to present to a user, the audience information including identifiers of users and/or user groups associated with the employee experience, the license type or types associated with the user experience, and an indicator whether the employee experience is a default employee experience. The administrator can designate a default employee experience to be presented to a user if the user does not match to any other employee experiences based on the affinity information associated with the user experiences.

FIG. 4C is an example of a user interface 440 for creating a new user experience. The administrator may access the user interface 440 by clicking on or otherwise activating the control 412 for creating a new employee experience on the user interface 405. The user interface includes a tool pane 442 and a content pane 443. The tool pane 442 includes a set of predefined panels and/or other content items that can be included on user experience. The administrator can drag the representations of various panels and/or other tools over to the content pane 443 to position those on content pane 443. The layout on the content pane 443 represents the layout of the employee experience when accessed by a user. The administrator can also configure various parameters used by the panels or other tools to select specific content to present to the user and/or to configure other behavior of these panels or tools. A technical benefit of this approach is that the administrator only needs to configure these panels or tools for a small number of employee experiences rather than having to customize the behavior of a single, one size fits all employee experience for each user. This latter approach is cumbersome and error prone and creates a lot of overhead for administrators to ensure that the single employee experience satisfies the needs of all of the users.

Figure 4D:
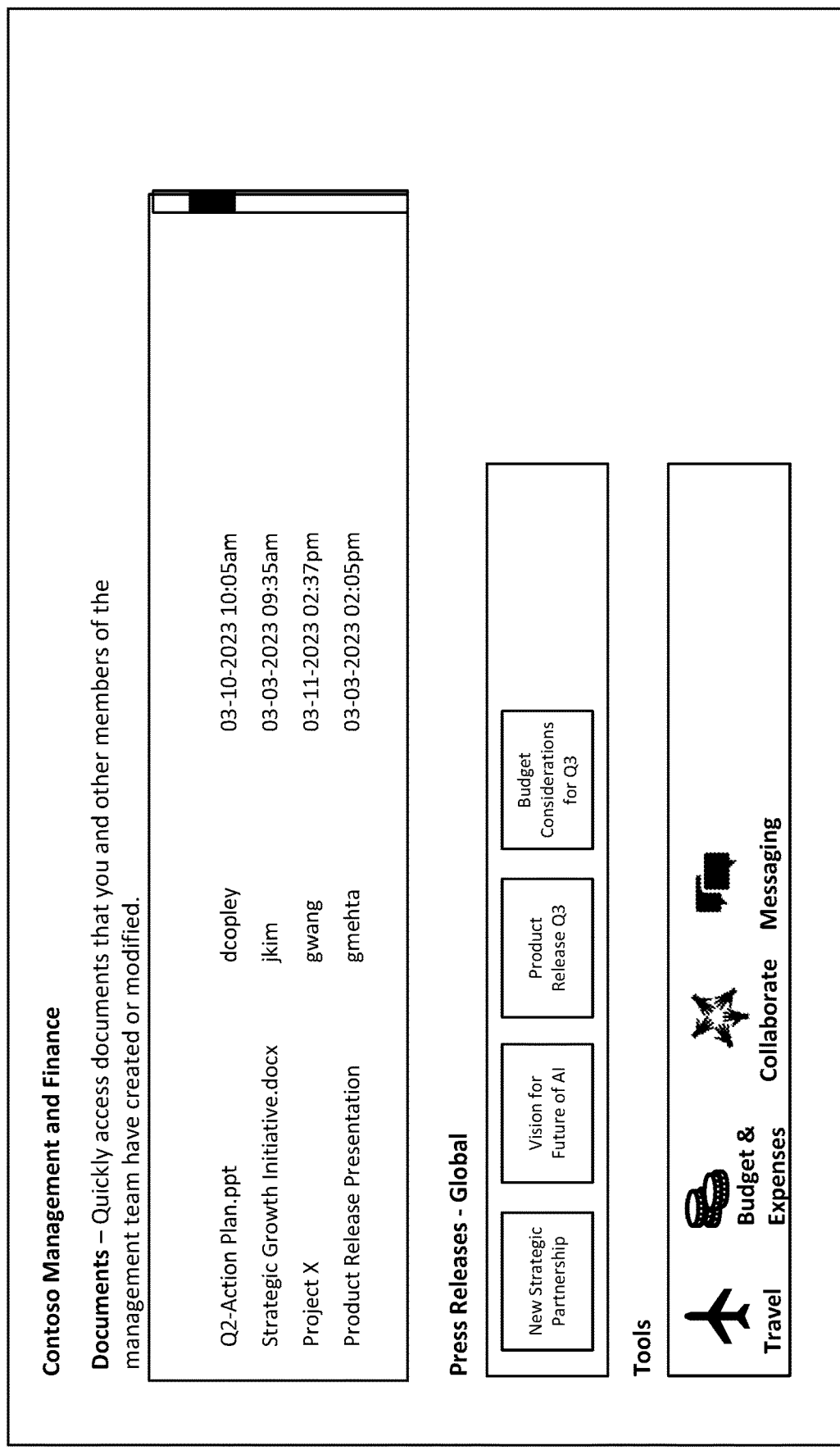

FIGS. 4D-4H provide examples of employee experiences that may be created using the techniques provided herein. The examples shown in FIGS. 4D-4G show example employee experiences created for various groups of users of the enterprise 105. FIG. 4D shows an example employee experience 446 for the management group 104a and the finance group 104b. FIG. 4E shows an example employee experience 448 for the human resources group 104c. FIG. 4F shows an example employee experience 450 for the subsidiary A 104c and FIG. 4G shows an example employee experience 452 for the subsidiary B. FIG. 4H shows an example employee experience 454 for the legal group 104d. FIG. 4I shows an example employee experience 456 which is used as a default experience to which other users not directed to one of the other employee experiences based on the affinity information provided by the administrator of the tenant 120. The layout and content of these examples is provided to demonstrate the techniques described herein. The layout and content of the user experiences in other implementations may differ from that shown in these examples.

Figure 4J:
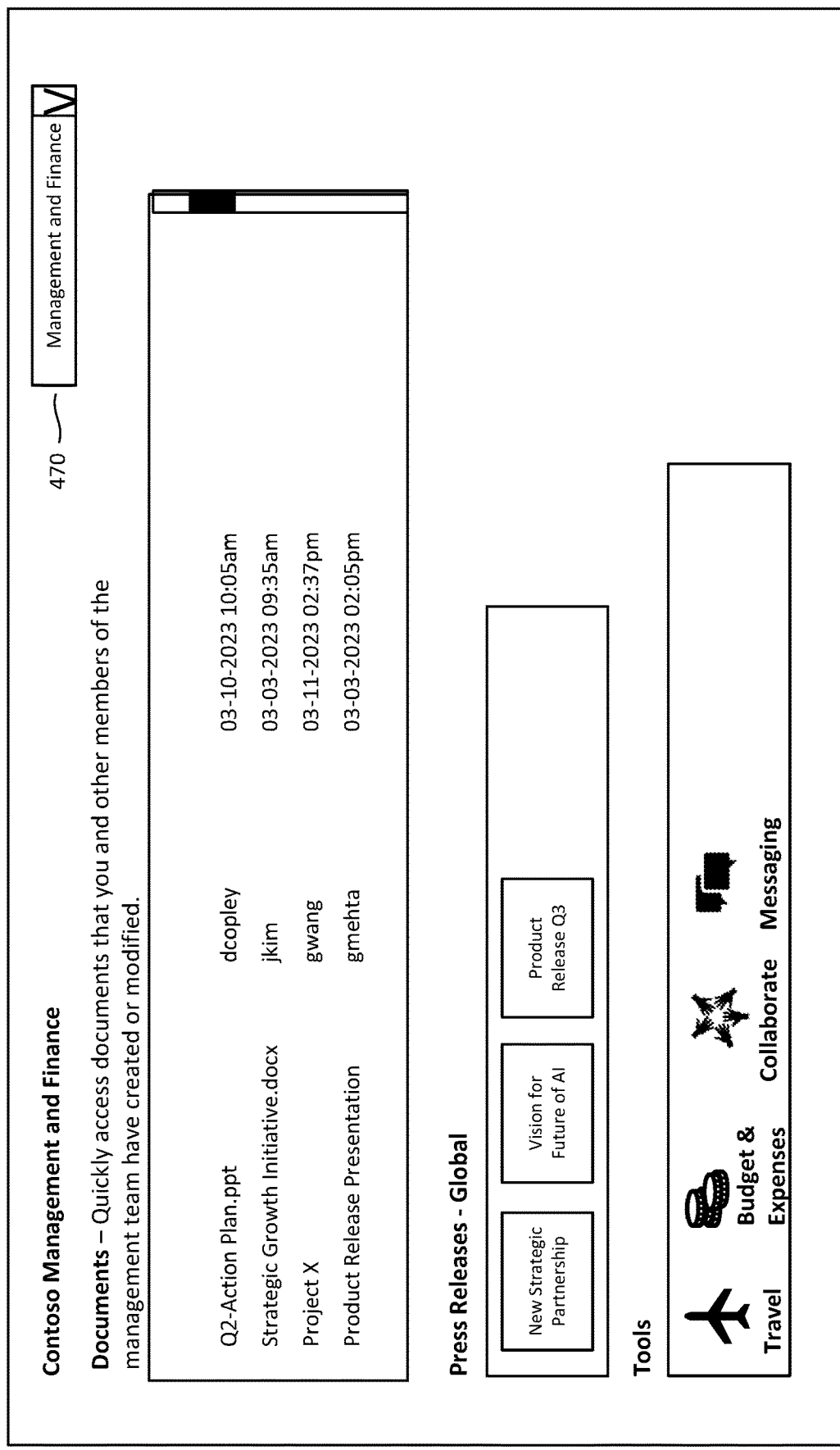
Figure 4K:
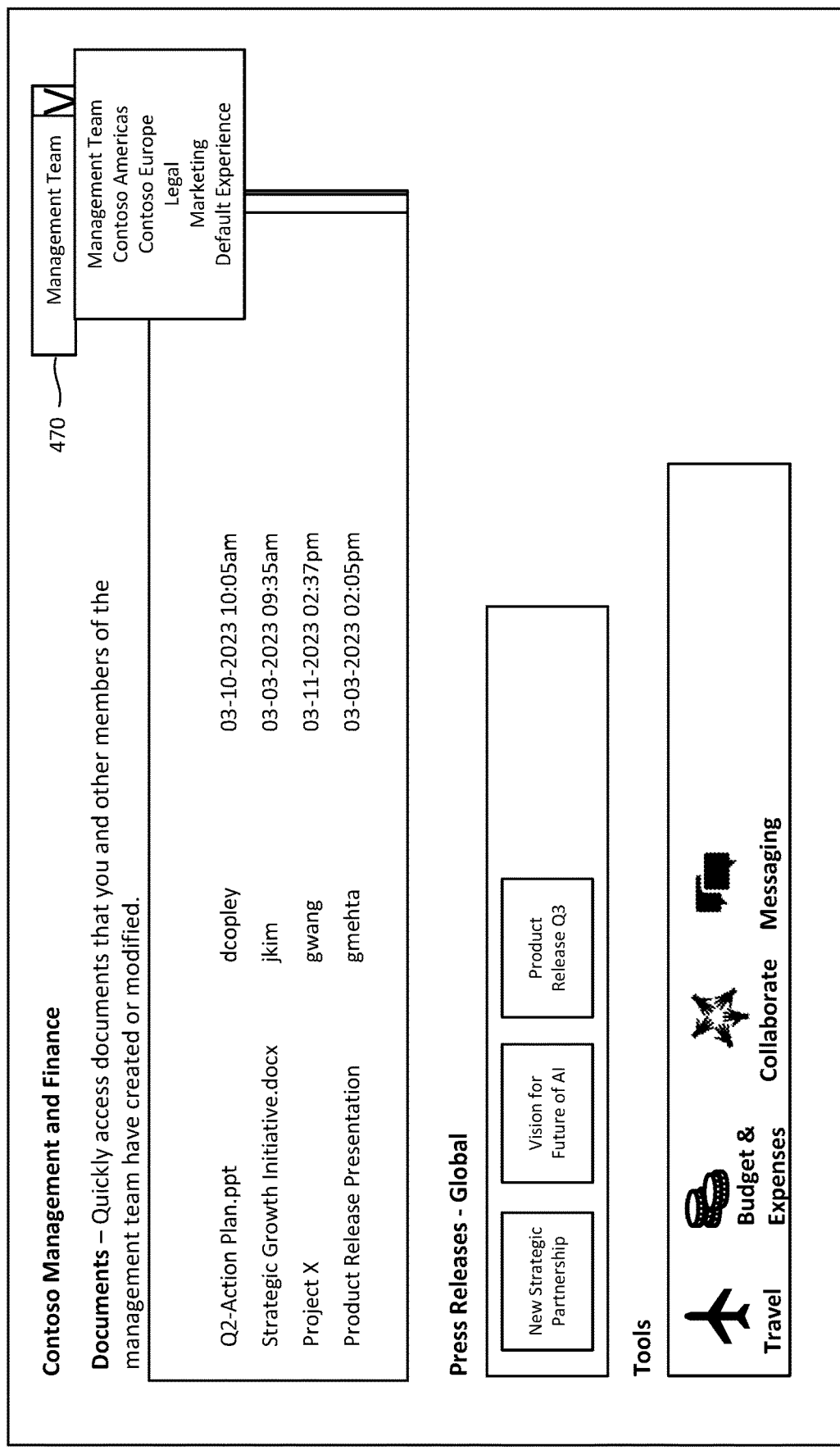

FIGS. 4J and 4K provide another example of the user interface 446 that includes an experience selector control 470. In some implementations, administrators and/or other users are able to select an employee experience to be presented to the user using the experience selector control 470. In such implementations, the experience selection unit 330 selects a user experience to present to the user based on the affinity information, but the user has the option to select a different user experience using the experience selector control 470. A technical benefit of this approach is that administrators, managers, and/or other such authorized users within an enterprise can view at least a subset of the employee experiences that are available in the organization. In some implementations, the experience selection unit 330 determines that the user may be presented with more than one employee experience based on the affinity information. The experience selection unit 330 selects an employee experience to present to the user based on the ordering defined by the administrator and populates the experience selector control 470 with the list of employee experiences that the user select to view.

Figure 4L:
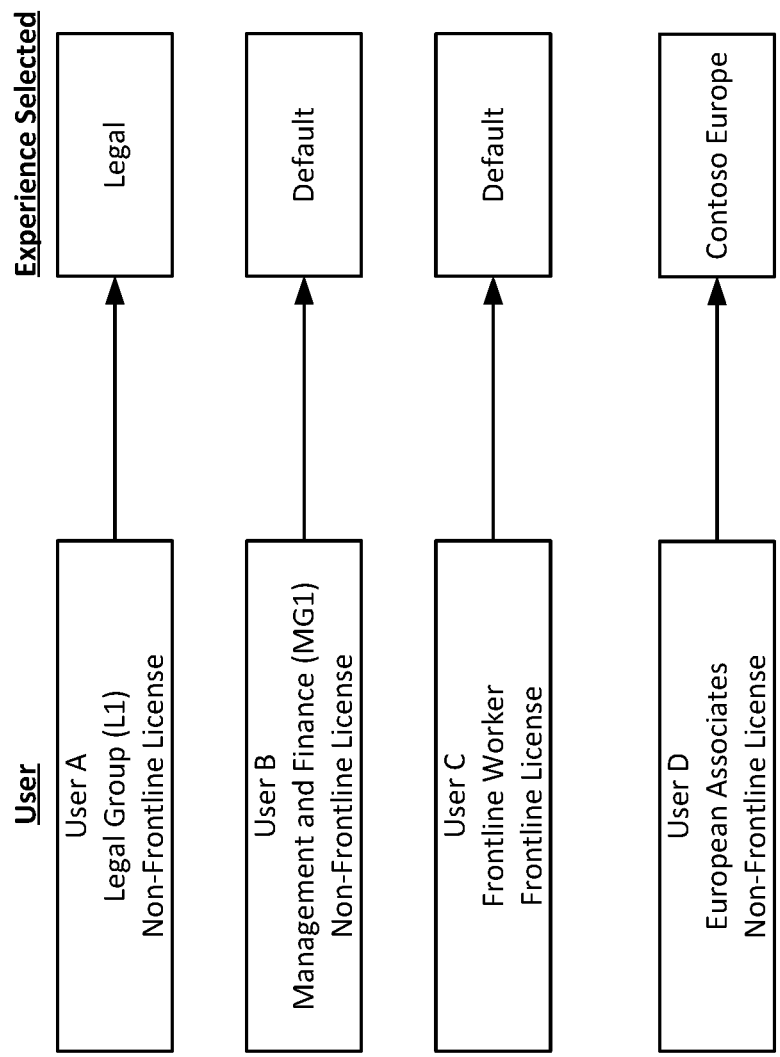
FIG. 4L is a diagram showing an example of users being directed to an employee experience based on the affinity information associated with the tenant.

FIG. 4L is a diagram that demonstrates the matching process applied by the multitenant computing platform 210 in response to a request for access to an employee experience for a particular user. The example shown in FIG. 4K uses the affinity information shown in FIG. 4A that includes audience targeting information, license-based targeting information, and selective ordering of the employee experiences to indicate which employee experience should be presented to the user. The requests for access to the employee experience are received from the native application 350 or the browser application 355 of the client device 205 of the user in some implementations. In other implementations, the web application 390 of the application services platform 225 sends the request for access to the employee experience which is presented as embedded by the web application 390. This configuration may be used to seamlessly integrate the employee experience into another application, such as but not limited to a collaboration platform or a communications platform.

The requests includes information identifying information identifying a particular user of the multitenant computing platform 210 for whom the request is being made, information identifying the tenant with which the user is associated, authentication information that indicates whether the user is authorized to access the services requested from the multitenant computing platform 210. The authentication information includes an access token in some implementations. The requests in other implementations may include subset of this information and/or a different combination of information.

The example shown in FIG. 4L includes a request from a first user, User A, who is a member of the legal group (LG1) and is associated with a non-frontline worker tenant license. The experience selection unit 330 accesses the affinity information for the tenant stored in the experience information datastore 345. In the example affinity information shown in FIG. 4A, there are seven employee experiences that have been defined. The experience selection unit 330 compares the audience indicator 409 and the license type indicator 410 with the user information provided with the request with each of the entries in the list of employee experiences until a match is found. In the example shown in FIG. 4A, the User A would not match with the first entry, because User A is associated with the legal group (LG1). However, User A would match with the second entry for the Legal employee experience, because User A matches the audience and the license type for the second entry. User A would be directed to the Legal employee experience 454 shown in FIG. 4H.

User B is a member of the management team and is associated with the management and finance group (MG1). User B is associated with a non-frontline worker tenant license. According to the affinity information for the tenant shown in FIG. 4B, User B would match with the Management and Finance employee experience because User B matches the audience and license type for this employee experience. However, the Management and Finance employee experience (shown in FIG. 4D) is set to the draft status, which indicates that the administrator is still creating or is modifying the employee experience. Consequently, the experience selection unit 330 directs User B to the Management and Finance employee experience. Therefore, the experience selection unit 330 continues sequentially through the list of employee experiences until User B a match is found with the Default experience shown in FIG. 4I. However, once the administrator enables the Management and Finance employee experience, the experience selection unit 330 would direct User B to the Management and Finance employee experience.

User C is a frontline worker that is associated with a frontline worker tenant license. The experience selection unit 330 would match User C with the Frontline Workers user experience based on the tenant license type in this example.

User D is an employee located in Europe and is associated with the S-B group of users in Subsidiary B of the enterprise. User D is also associated with a non-frontline worker tenant license. The experience selection unit 330 would match User D with the Contoso Europe user experience based on the audience and the license type in this example.

The audience indicators in this example user using user groups. However, specific users may also be associated with the audience of a particular employee experiences in other implementations in addition to or instead of the user groups.

FIGS. 5A and 5B show details of a user interface 505 for managing the targeted intranet sites for a tenant in a multitenant computing environment. The user interface 505 operates similarly to the user interface 405 shown in FIGS. 4A and 4B for managing employee experiences. The user interface 505 includes a control 512 for creating a new targeted intranet site and a control 513 for changing the order of the intranet sites that have already been created. The order of the intranet sites is the order in which the intranet site selection unit 335 considers each of the intranet sites when determining the intranet site to which to direct the user. The user interface 505 includes a list of the employee experiences that have been created. The list includes a name 506 of the targeted intranet site, a status indicator 507 of the intranet site, an order indicator 508, an audience indicator 509, a license type indictor 510, and a default site indicator 511. The name 506 is a name assigned to the intranet site by the administrator. The status indicator 507 indicates whether the intranet site is in a draft state or is enabled. When the administrator creates a new intranet site, the intranet site is initially in the draft state. Once the administrator is satisfied with the configuration of the intranet site, the administrator can switch the state of the intranet site from the draft state to the enabled state. The intranet site selection unit 335 only considers those intranet sites that are in the enabled state when determining which intranet site to present to a user.

FIG. 5B shows an example of the user interface 505 in which an intranet site pane 514 is displayed. The experience editor pane 514 enables an administrator of the tenant to edit the attributes of a targeted intranet site. The experience editor pane 514 can be accessed by clicking on or otherwise activating one of the employee experiences show in the list of employee experiences on the user interface 405. The multitenant computing platform 210 stores the updated information in the experience configuration data structure 650 shown in FIG. 6B in some implementations. The experience configuration data structure 650 includes the name of the employee experience, the status of the employee experience, the order in which the employee experiences are to be considered when determining which employee experience to present to a user, the audience information including identifiers of users and/or user groups associated with the employee experience, the license type or types associated with the user experience, and an indicator whether the employee experience is a default employee experience. The administrator can designate a default employee experience to be presented to a user if the user does not match to any other employee experiences based on the affinity information associated with the user experiences.

Figure 5C:
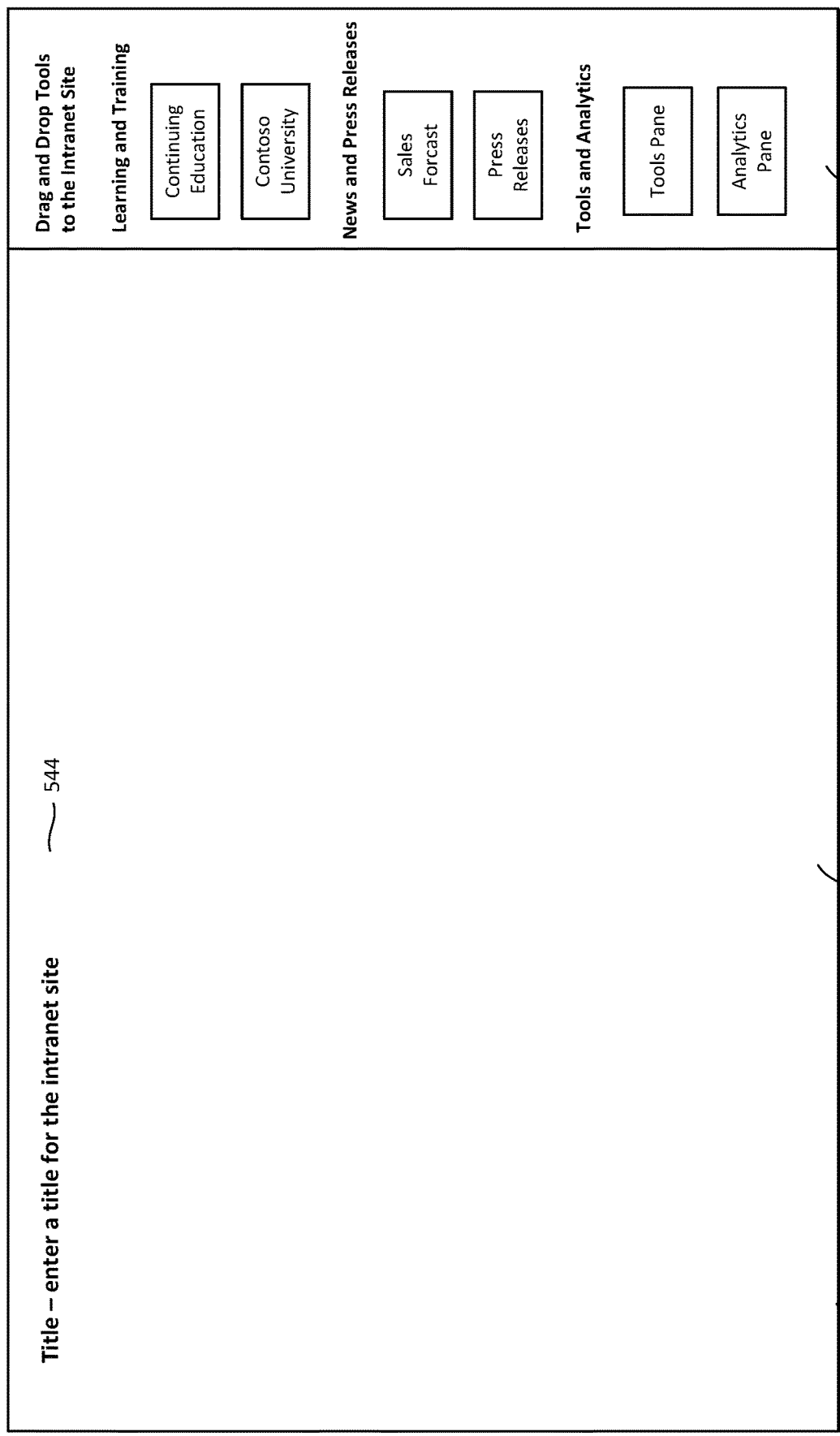

FIG. 5C is an example of a user interface 540 for creating a new targeted internet site. The user interface 540 is similar to the user interface 440 used to create new employee experiences shown in FIG. 4C. In some implementations, the functionality of the user interfaces 440 and 540 are combined into a single user interface that enables an administrator to create both targeted intranet sites and employee experiences. The administrator may access the user interface 540 by clicking on or otherwise activating the control 512 for creating a new targeted intranet site on the user interface 505. The user interface includes a tool pane 542 and a content pane 543. The tool pane 542 includes a set of predefined panels and/or other content items that can be included on targeted intranet site. The administrator can drag the representations of various panels and/or other tools over to the content pane 543 to position those on content pane 543. The layout on the content pane 543 represents the layout of the intranet site when accessed by a user. The administrator can also configure various parameters used by the panels or other tools to select specific content to present to the user and/or to configure other behavior of these panels or tools. A technical benefit of this approach is that the administrator only needs to configure these panels or tools for a small number of intranet sites rather than having to customize the behavior of a single, one size fits all intranet site to accommodate a wide variety of users of an enterprise.

Figure 5D:
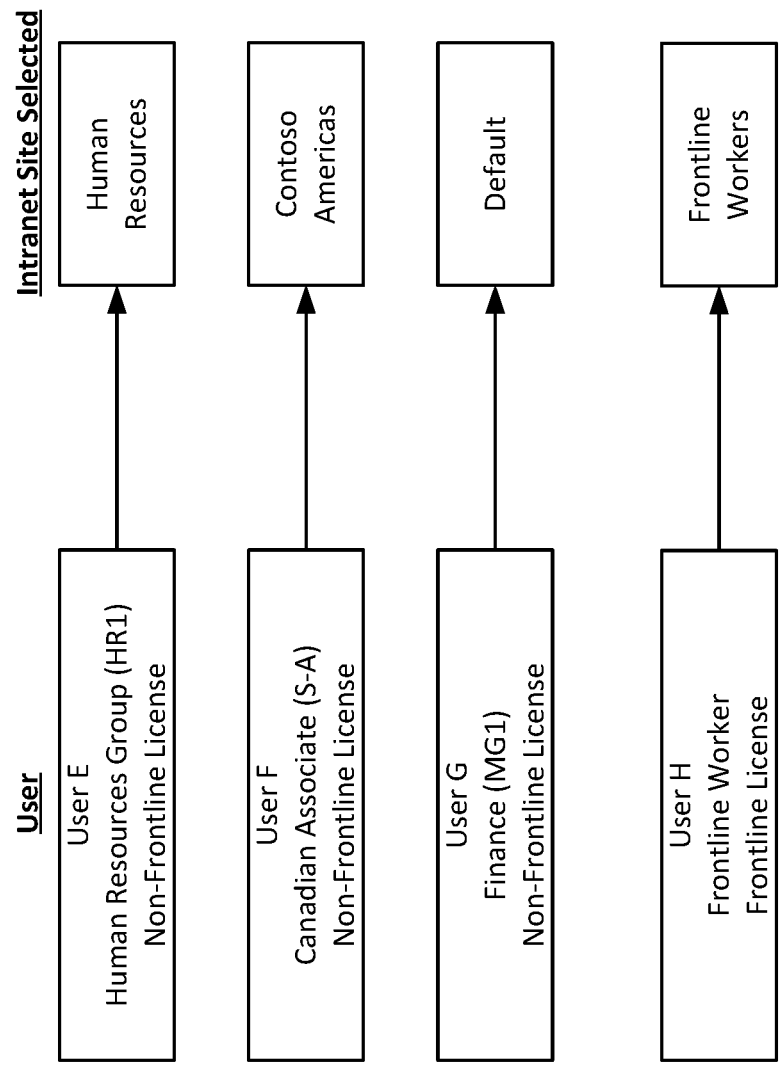
FIG. 5D is a diagram showing an example of users being directed to a targeted internet site based on the affinity information associated with the tenant.

FIG. 5D is a diagram that demonstrates the matching process applied by the multitenant computing platform 210 in response to a request for access to a targeted intranet site for a particular user. The example shown in FIG. 5C uses the affinity information shown in FIG. 5A that includes audience targeting information, license-based targeting information, and selective ordering of the employee experiences to indicate which employee experience should be presented to the user. The affinity information for the user experiences shown in FIG. 4A and the affinity information for the targeted intranet sites in FIG. 5A are identical as there are corresponding employee experience and intranet sites. However, in other implementations, the employee experiences and the targeted intranet sites may not directly correspond with one another and the affinity information for selecting the targeted intranet sites will differ from the affinity information for selecting the employee experiences.

The requests for access to the targeted intranet site are received from the native application 350 or the browser application 355 of the client device 205 of the user in some implementations. In other implementations, the web application 390 of the application services platform 225 sends the request for access to the targeted intranet site which is presented as embedded by the web application 390. This configuration may be used to seamlessly integrate content of the intranet site into another application, such as but not limited to a collaboration platform or a communications platform.

User E is part of the Human Resources group (HR1), and the user has a non-frontline worker tenant license. The intranet site selection unit 335 accesses the affinity information for the targeted intranet sites for the tenant from the site information datastore 340. The intranet site selection unit 335 matches User E with the Human Resources intranet site.

User F is a Canadian associate and is associated with a non-frontline tenant license. The intranet site selection unit 335 matches User F with the Contoso Americas intranet site in this example, because the User F falls into the user group S-A which is included in the audience for the Contoso Americas intranet site.

User G is in the finance department and is associated with the management and finance group (MG1). The intranet site selection unit 335 cannot match User G with the Management and Finance intranet site because the Management and Finance intranet site is in the draft status. Instead, User G is directed to the Default intranet site based on the audience and license type information associated with the user.

User H is a frontline worker and is associated with a front-line worker tenant license. The intranet site selection unit 335 matches User H with the Frontline Workers intranet site in this example based on the tenant license type associated with User H.

Figure 7A:
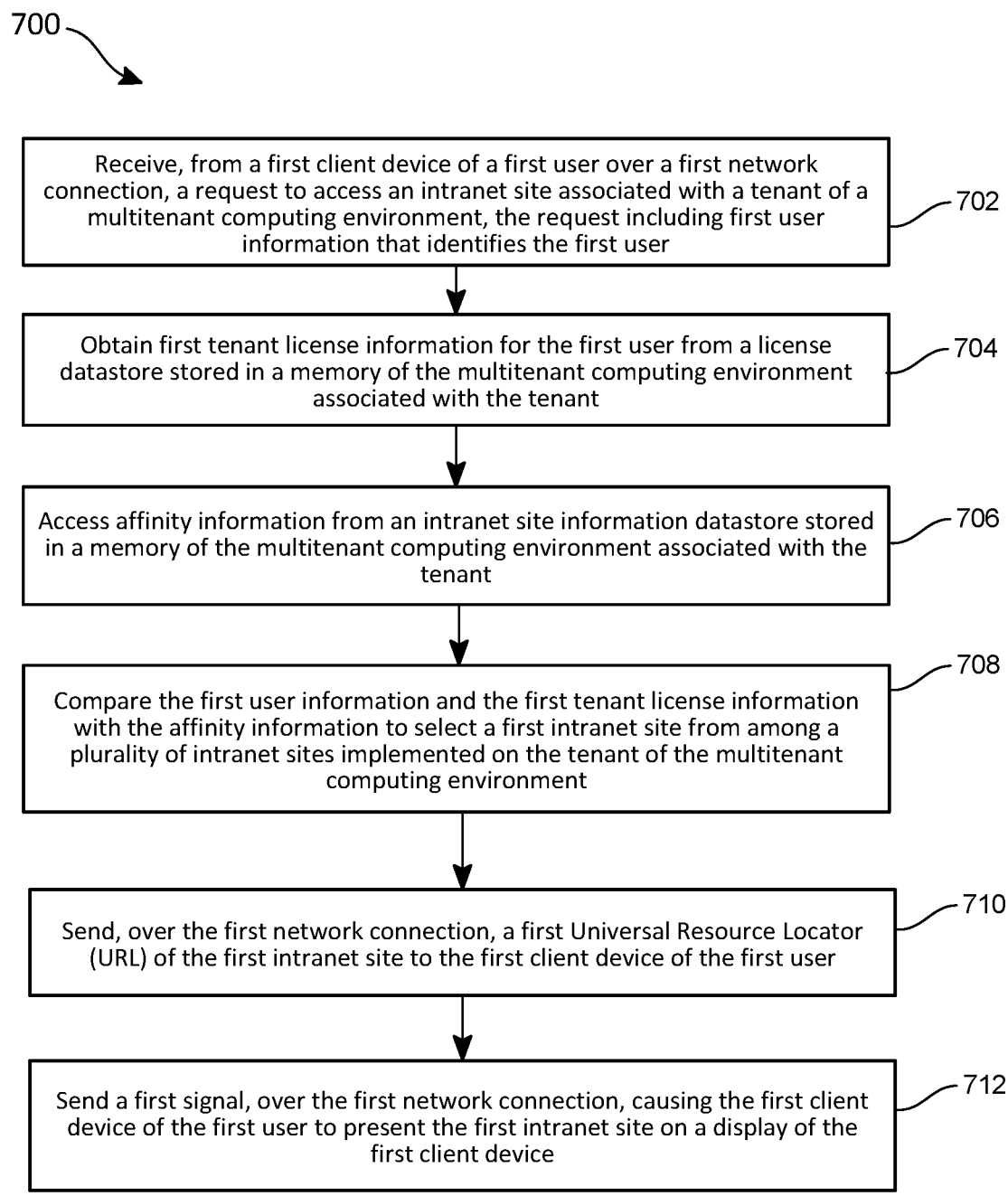
FIG. 7A is a flow chart of an example process for providing multiple targeted intranet sites within a tenant of a multitenant computing environment according to the techniques provided herein.

FIG. 7A is a flow chart of an example process 700 for providing multiple targeted intranet sites within a tenant of a multitenant computing environment according to the techniques provided herein. The process 700 may be implemented by the multitenant computing platform 210 and/or the client device 205 using the techniques described in the preceding examples.

The process 700 includes an operation 702 of receiving from a first client device of a first user over a first network connection, a request to access an intranet site associated with a tenant of a multitenant computing environment, the request including first user information that identifies the first user. As discussed in the preceding examples the requests may be generated by the native application 350 or the browser application 355 of the client device 205 or by the web application 390 of the application services platform 225.

The process 700 includes an operation 704 of obtaining first tenant license information for the first user from a license datastore stored in a memory of the multitenant computing environment associated with the tenant. The intranet site selection unit 335 accesses the license datastore 375 to obtain the license information for the first user.

The process 700 includes an operation 706 of accessing affinity information from an intranet site information datastore stored in a memory of the multitenant computing environment associated with the tenant. The intranet site selection unit 335 accesses the affinity information stored in the site information datastore 340 for the tenant.

The process 700 includes an operation 708 of comparing the first user information and the first tenant license information with the affinity information to select a first intranet site from among a plurality of intranet sites implemented on the tenant of the multitenant computing environment. As discussed in the preceding examples, the intranet site selection unit 335 compares the user information and license information with the affinity information to select an intranet site from among the available intranet sites to which to direct the user.

The process 700 includes an operation 710 of sending, over the first network connection, a first Universal Resource Locator (URL) of the first intranet site to the first client device of the first user. The intranet site selection unit 335 obtains the URL from the intranet configuration data structure 605 used to store the information for the first intranet site in the intranet site information datastore 340.

The process 700 includes an operation 712 of sending a first signal, over the first network connection, causing the first client device of the first user to present the first intranet site on a display of the first client device. The intranet site selection unit 335 can send a signal to the first client device 205 to cause the first client device 205 to display the URL. The specific format of this signal may vary depending on the implementation. In some implementations, the intranet site selection unit 335 sends a response to request received in operation 702 that includes the URL, and receipt of this response causes the first client device to display the intranet site.

Figure 7B:
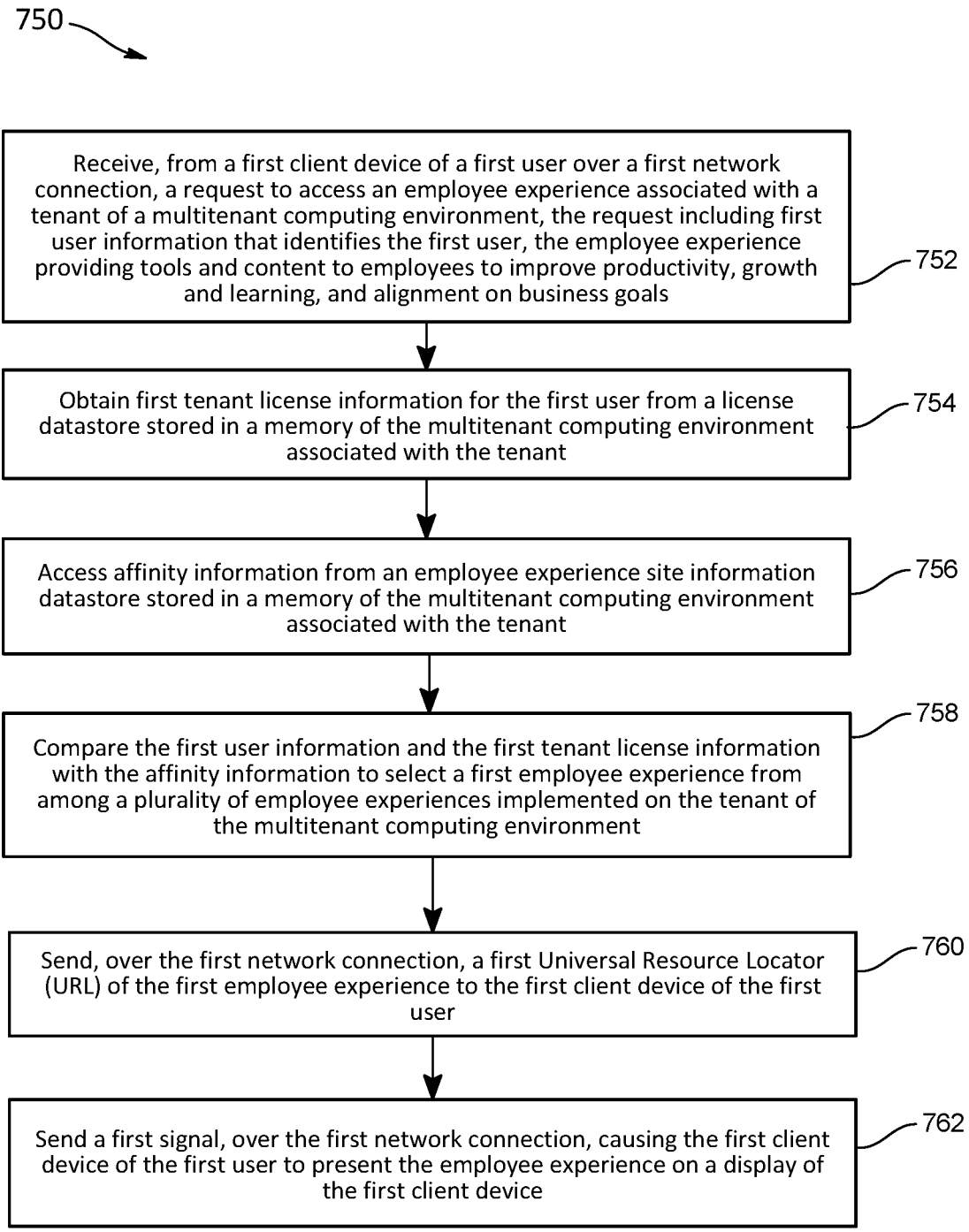
FIG. 7B is a flow chart of an example process for providing multiple targeted employee experiences within a tenant of a multitenant computing environment according to the techniques provided herein.

FIG. 7B is a flow chart of an example process 750 for providing multiple targeted employee experiences within a tenant of a multitenant computing environment according to the techniques provided herein.

The process 750 includes an operation 752 of receiving from a first client device of a first user over a first network connection, a request to access an employee experience associated with a tenant of a multitenant computing environment. The request includes first user information that identifies the first user. The employee experience provides tools and content to employees to improve productivity, growth and learning, and alignment on business goals. As discussed in the preceding examples the requests may be generated by the native application 350 or the browser application 355 of the client device 205 or by the web application 390 of the application services platform 225.

The process 750 includes an operation 754 of obtaining first tenant license information for the first user from a license datastore stored in a memory of the multitenant computing environment associated with the tenant. The experience selection unit 330 accesses the license datastore 375 to obtain the license information for the first user.

The process 750 includes an operation 756 of accessing affinity information from an employee experience site information datastore stored in a memory of the multitenant computing environment associated with the tenant. The experience selection unit 330 accesses the affinity information stored in the site information datastore 340 for the tenant.

The process 750 includes an operation 758 of comparing the first user information and the first tenant license information with the affinity information to select a first employee experience from among a plurality of employee experiences implemented on the tenant of the multitenant computing environment. As discussed in the preceding examples, the experience selection unit 330 compares the user information and license information with the affinity information to select an employee experience from among the available employee experiences to which to direct the user.

The process 750 includes an operation 760 of sending, over the first network connection, a first Universal Resource Locator (URL) of the first employee experience to the first client device of the first user. The experience selection unit 330 obtains the URL from the experience configuration data structure 650 used to store the information for the first employee experience in the experience information datastore 345.

The process 750 includes an operation 762 of sending a first signal, over the first network connection, causing the first client device of the first user to present the employee experience on a display of the first client device. The experience selection unit 330 can send a signal to the first client device 205 to cause the first client device 205 to display the URL. The specific format of this signal may vary depending on the implementation. In some implementations, the experience selection unit 330 sends a response to request received in operation 752 that includes the URL, and receipt of this response causes the first client device to display the employee experience.

The detailed examples of systems, devices, and techniques described in connection with FIGS. 1A-7B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1A-7B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
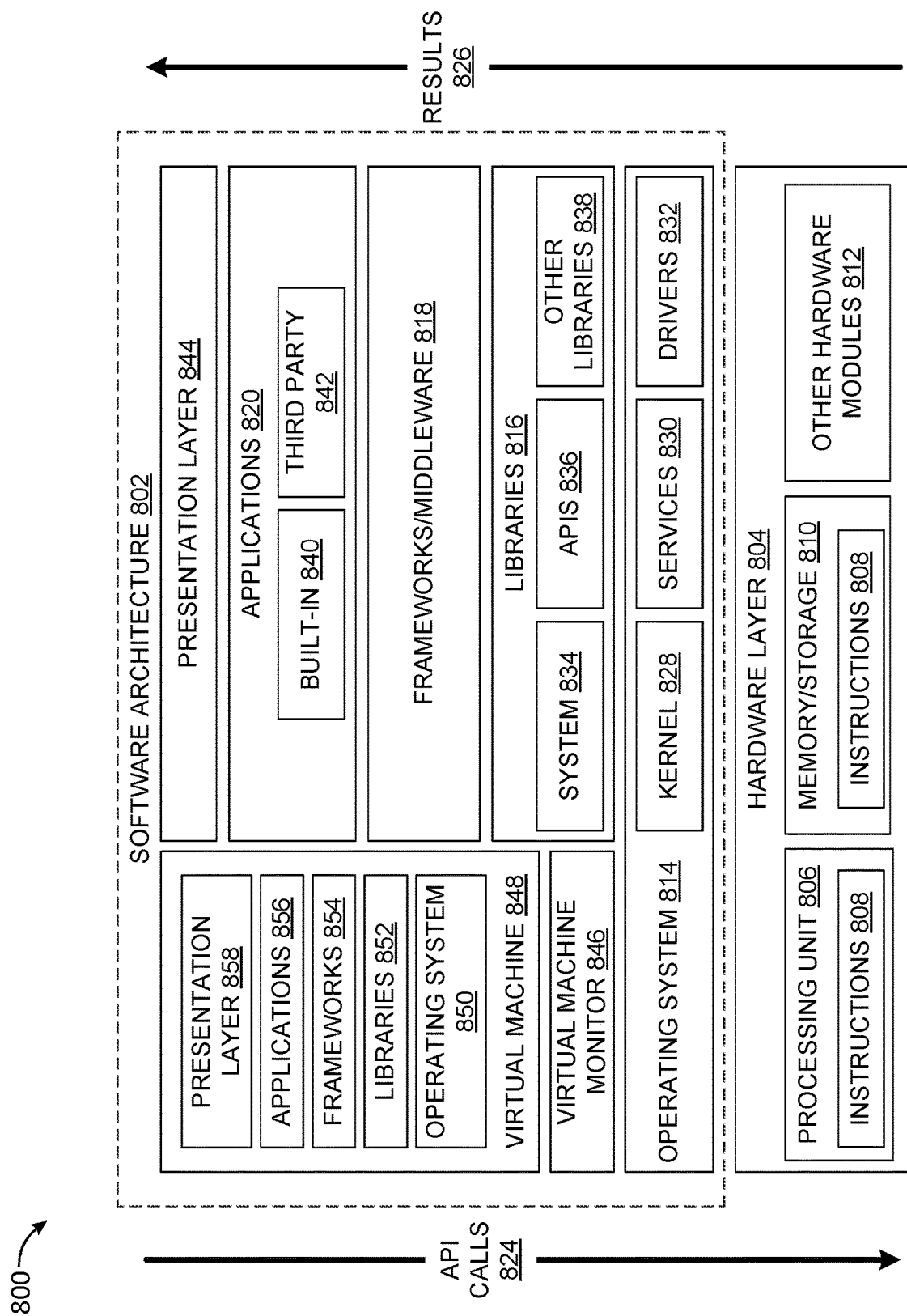
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
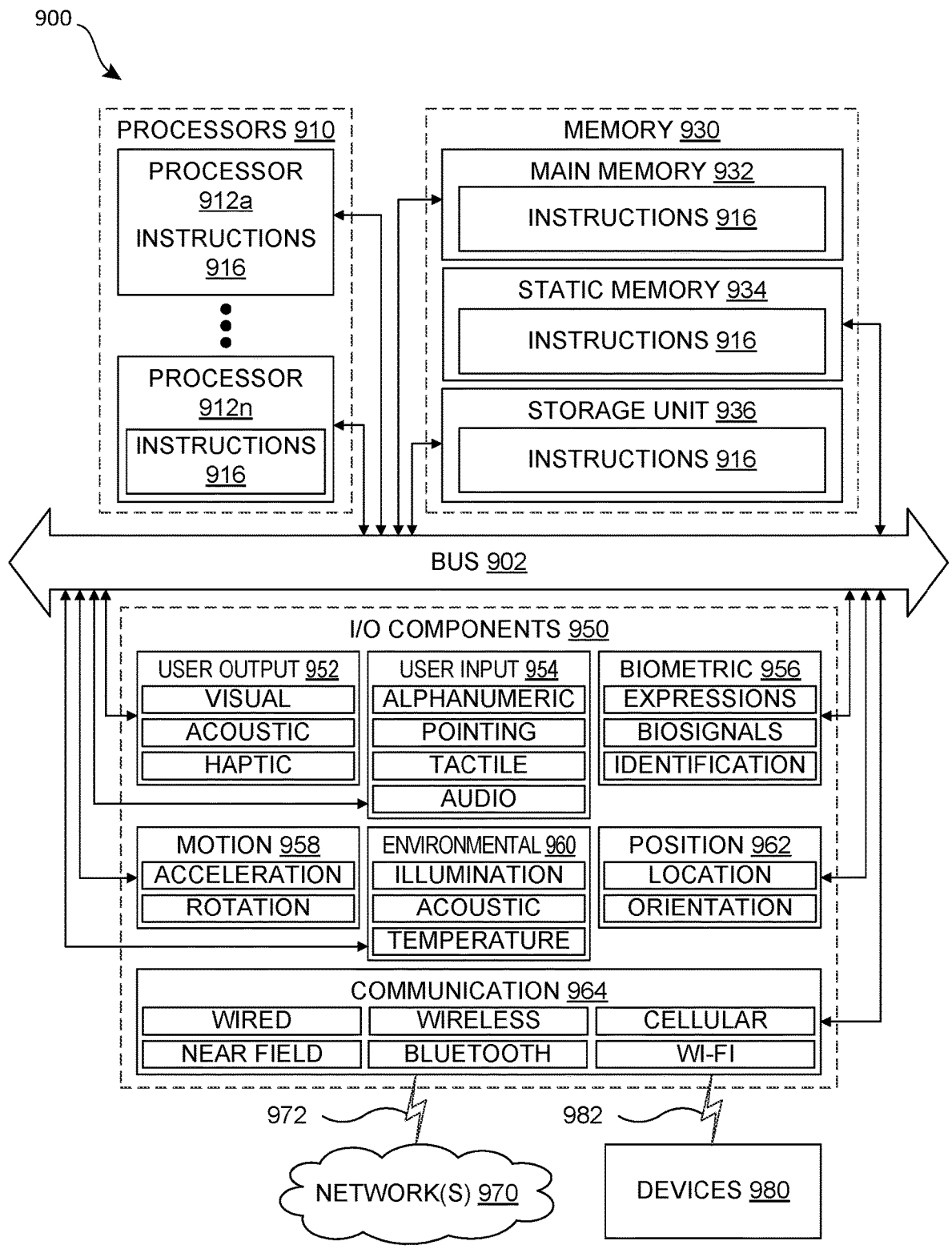
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations of:
receiving, from a first client device of a first user over a first network connection, a request to access an intranet site associated with a tenant of a multitenant computing environment, the request including first user information that identifies the first user;
obtaining first tenant license information for the first user from a license datastore stored in a memory of the multitenant computing environment associated with the tenant;
accessing affinity information from an intranet site information datastore stored in a memory of the multitenant computing environment associated with the tenant, wherein the affinity information is one or more of: audience information, license type information, or an order in which intranet sites are considered for presentation to the first user;
comparing the first user information and the first tenant license information with the affinity information to select a first intranet site from among a plurality of intranet sites implemented on the tenant of the multitenant computing environment;
sending, over the first network connection, a first Universal Resource Locator (URL) of the first intranet site to the first client device of the first user; and
sending a first signal, over the first network connection, causing the first client device of the first user to present the first intranet site on a display of the first client device.

2. The data processing system of claim 1, wherein the audience information identifies one or more users, one or more groups of users, or a combination thereof associated with each intranet site of the plurality of intranet sites.

3. The data processing system of claim 1, wherein the license type information identifies one or more license types associated with each intranet site of the plurality of intranet sites.

4. The data processing system of claim 2, wherein comparing the first user information and the first tenant license information with the affinity information to select the first intranet site further comprises comparing the first user information and the first tenant license information with the audience information and the license type information for each intranet site according to the order indicated in the affinity information until a first matching intranet site is determined.

5. The data processing system of claim 4, wherein comparing the first user information and the first tenant license information with the audience information and the license type information for each intranet site further comprises:
determining that the first user is included in at least one of the one or more users, or the one or more groups of users identified in the audience information for the intranet site;
determining, based on the first tenant license information, that the first user is associated with a tenant license type included in the one or more license types identified in the license type information for the intranet site; and
selecting the intranet site as the first intranet site responsive to the first user being is included in at least one of the one or more users, or the one or more groups of users identified in the audience information for the intranet site and the first user being associated with the tenant license type included in the one or more license types identified in the license type information for the intranet site.

6. The data processing system of claim 1, wherein the machine-readable storage medium further includes instructions configured to cause the processor to perform operations of:
receiving, from a second client device of a second user over a second network connection, a second request to access the intranet site associated with a tenant of the multitenant computing environment, the request including second user information that identifies the second user;
obtaining second tenant license information for the second user from the license datastore stored in the memory of the multitenant computing environment associated with the tenant;
accessing the affinity information from the intranet site information datastore stored in the memory of the multitenant computing environment associated with the tenant;
comparing the second user information and the second tenant license information with the affinity information to select a second intranet site from among the plurality of intranet sites implemented on the tenant of the multitenant computing environment, wherein the second intranet site is different than the first intranet site;
sending, over the first network connection, a second URL of the second intranet site to the second client device of the second user; and sending a second signal, over the second network connection, causing the second client device of the second user to present the second intranet site on the display of the second client device.

7. A method implemented in a data processing system for presenting targeted intranet sites in a multitenant environment, the method comprising:
   receiving, from a first client device of a first user over a first network connection, a request to access an intranet site associated with a tenant of the multitenant computing environment, the request including first user information that identifies the first user;
   obtaining first tenant license information for the first user from a license datastore stored in a memory of the multitenant computing environment associated with the tenant;
   accessing affinity information from an intranet site information datastore stored in a memory of the multitenant computing environment associated with the tenant, wherein the affinity information is one or more of: audience information, license type information, or an order in which intranet sites are considered for presentation to the first user;
   comparing the first user information and the first tenant license information with the affinity information to select a first intranet site from among a plurality of intranet sites implemented on the tenant of the multitenant computing environment;
   sending, over the first network connection, a first Universal Resource Locator (URL) of the first intranet site to the first client device of the first user; and
   sending a first signal, over the first network connection, causing the first client device of the first user to present the first intranet site on a display of the first client device.

8. The method of claim 7, wherein the audience information identifies one or more users, one or more groups of users, or a combination thereof associated with each intranet site of the plurality of intranet sites.

9. The method of claim 7, wherein the license type information identifies one or more license types associated with each intranet site of the plurality of intranet sites.

10. The method of claim 8, wherein comparing the first user information and the first tenant license information with the affinity information to select the first intranet site further comprises comparing the first user information and the first tenant license information with the audience information and the license type information for each intranet site according to the order indicated in the affinity information until a first matching intranet site is determined.

11. The method of claim 10, wherein comparing the first user information and the first tenant license information with the audience information and the license type information for each intranet site further comprises:
   determining that the first user is included in at least one of the one or more users, or the one or more groups of users identified in the audience information for the intranet site;
   determining, based on the first tenant license information, that the first user is associated with a tenant license type included in the one or more license types identified in the license type
   selecting the intranet site as the first intranet site responsive to the first user being is included in at least one of the one or more users, or the one or more groups of users identified in the audience information for the intranet site and the first user being associated with the tenant license type included in the one or more license types identified in the license type information for the intranet site.

12. A data processing system comprising:
   a processor; and
   a machine-readable storage medium storing executable instructions that, when executed, cause the processor to perform operations of:
      receiving, from a first client device of a first user over a first network connection, a request to access an employee experience associated with a tenant of a multitenant computing environment, the request including first user information that identifies the first user, the employee experience providing tools and content to employees to improve productivity, growth and learning, and alignment on business goals;
      obtaining first tenant license information for the first user from a license datastore stored in a memory of the multitenant computing environment associated with the tenant;
      accessing affinity information from an employee experience site information datastore stored in a memory of the multitenant computing environment associated with the tenant, wherein the affinity information is one or more of: audience information, license type information, or an order in which employee experiences are considered for presentation to the first user;
      comparing the first user information and the first tenant license information with the affinity information to select a first employee experience from among a plurality of employee experiences implemented on the tenant of the multitenant computing environment;
      sending, over the first network connection, a first Universal Resource Locator (URL) of the first employee experience to the first client device of the first user; and
      sending a first signal, over the first network connection, causing the first client device of the first user to present the employee experience on a display of the first client device.

13. The data processing system of claim 12, wherein the audience information identifies one or more users, one or more groups of users, or a combination thereof associated with each employee experience of the plurality of employee experiences.

14. The data processing system of claim 12, wherein the license type information identifies one or more license types associated with each employee experience of the plurality of employee experiences.

15. The data processing system of claim 13, wherein comparing the first user information and the first tenant license information with the affinity information to select the first employee experience further comprises comparing the first user information and the first tenant license information with the audience information and the license type information for each employee experience according to the order indicated in the affinity information until a first matching employee experience is determined.

16. The data processing system of claim 15, wherein comparing the first user information and the first tenant license information with the audience information and the license type information for each employee experience further comprises:

determining that the first user is included in at least one of the one or more users, or the one or more groups of users identified in the audience information for the employee experience;

determining, based on the first tenant license information, that the first user is associated with a tenant license type included in the one or more license types identified in the license type information for the employee experience; and selecting the employee experience as the first employee experience responsive to the first user being is included in at least one of the one or more users, or the one or more groups of users identified in the audience information for the employee experience and the first user being associated with the tenant license type included in the one or more license types identified in the license type information for the employee experience.

17. The data processing system of claim 12, wherein the machine-readable storage medium further includes instructions configured to cause the processor to perform operations of:

receiving, from a second client device of a second user over a second network connection, a second request to access the employee experience associated with a tenant of the multitenant computing environment, the request including second user information that identifies the second user;

obtaining second tenant license information for the second user from the license datastore stored in the memory of the multitenant computing environment associated with the tenant;

accessing the affinity information from the employee experience information datastore stored in the memory of the multitenant computing environment associated with the tenant;

comparing the second user information and the second tenant license information with the affinity information to select a second employee experience from among the plurality of employee experiences implemented on the tenant of the multitenant computing environment, wherein the second employee experience is different than the first employee experience;

sending, over the first network connection, a second URL of the second employee experience to the second client device of the second user; and sending a second signal, over the second network connection, causing the second client device of the second user to present the second employee experience on the display of the second client device.

\* \* \* \* \*